United States Patent
Jacobs et al.

(10) Patent No.: US 7,058,748 B1
(45) Date of Patent: Jun. 6, 2006

(54) ATA DEVICE CONTROL VIA A PACKET-BASED INTERFACE

(75) Inventors: Daniel G. Jacobs, Meridian, ID (US); James E. Castleberry, Boise, ID (US)

(73) Assignee: Cypress Semiconductor Corp., San Jose, CA (US)

(*) Notice: Subject to any disclaimer, the term of this patent is extended or adjusted under 35 U.S.C. 154(b) by 411 days.

(21) Appl. No.: 10/186,884

(22) Filed: Jun. 28, 2002

Related U.S. Application Data

(63) Continuation-in-part of application No. 09/671,554, filed on Sep. 27, 2000, now Pat. No. 6,618,788.

(51) Int. Cl.
*G06F 13/36* (2006.01)
*G06F 13/00* (2006.01)

(52) U.S. Cl. .................. 710/311; 710/315; 719/327

(58) Field of Classification Search ............. 710/315, 710/35, 2, 22; 711/219, 112; 709/250; 714/724, 714/42; 341/100; 345/11; 702/187
See application file for complete search history.

(56) References Cited

U.S. PATENT DOCUMENTS

| | | | | |
|---|---|---|---|---|
| 4,592,013 A | * | 5/1986 | Prame | 711/219 |
| 5,828,854 A | * | 10/1998 | Wade | 710/315 |
| 5,943,029 A | * | 8/1999 | Ross | 345/11 |
| 6,040,792 A | * | 3/2000 | Watson et al. | 341/100 |
| 6,055,656 A | * | 4/2000 | Wilson et al. | 714/724 |
| 6,070,196 A | * | 5/2000 | Mullen, Jr. | 709/250 |
| 6,115,771 A | * | 9/2000 | Born | 710/315 |
| 6,199,122 B1 | * | 3/2001 | Kobayashi | 710/36 |
| 6,233,640 B1 | * | 5/2001 | Luke et al. | 710/315 |
| 6,446,148 B1 | * | 9/2002 | Goodfellow | 710/2 |
| 6,467,054 B1 | * | 10/2002 | Lenny | 714/42 |
| 6,480,932 B1 | * | 11/2002 | Vallis et al. | 711/112 |
| 6,493,656 B1 | * | 12/2002 | Houston et al. | 702/187 |
| 6,697,885 B1 | * | 2/2004 | Goodfellow | 710/22 |
| 6,728,830 B1 | * | 4/2004 | Assaf | 711/112 |
| 2003/0088868 A1 | * | 5/2003 | Chang et al. | 717/173 |
| 2003/0196021 A1 | * | 10/2003 | Botchek | 710/315 |

* cited by examiner

*Primary Examiner*—Glenn A. Auve
*Assistant Examiner*—Christopher E. Lee
(74) *Attorney, Agent, or Firm*—Marger Johnson & McCollom

(57) ABSTRACT

ATA devices, such as mass storage units, have increasingly larger storage sizes that use larger configuration register sizes. A command block format allows the USB/ATA bridge circuit to be used with ATA devices with larger registers and at the same time operates with earlier ATA command block formats.

20 Claims, 15 Drawing Sheets

| Byte | ATACB2 |
|---|---|
| 0 | Signature |
| 1 | Subcommand |
| 2 | RegisterSelect(7:0) |
| 3 | ActionSelect1(7:0) |
| 4 | TransferBlockCount(3:0), ActionSelect2(11:8) |
| 5 | (1F6h) - Device Head |
| 6 | (1F1h) - Features |
| 7 | (1F2h) - M-Sector Count |
| 8 | (1F3h) - M-Sector Number |
| 9 | (1F4h) - M-Cylinder Low |
| 10 | (1F5h) - M-Cylinder High |
| 11 | (1F7h) - L-Sector Count |
| 12 | (1F3h) - L-Sector Number |
| 13 | (1F4h) - L-Cylinder Low |
| 14 | (1F4h) - L-Cylinder High |
| 15 | (1F7h) - Command |

| Byte \ Bit | 7 | 6 | 5 | 4 | 3 | 2 | 1 | 0 |
|---|---|---|---|---|---|---|---|---|
| 0 | | | | | | | | |
| 1 | \multicolumn{8}{c|}{dCBWSignature (43425355h)} |
| 2 | | | | | | | | |
| 3 | | | | | | | | |
| 4 | | | | | | | | |
| 5 | \multicolumn{8}{c|}{dCBWTag} |
| 6 | | | | | | | | |
| 7 | | | | | | | | |
| 8 | | | | | | | | |
| 9 | \multicolumn{8}{c|}{dCBWTransferLength} |
| 10 | | | | | | | | |
| 11 | | | | | | | | |
| 12 | \multicolumn{8}{c|}{bmCBWFlags} |
| 13 | \multicolumn{4}{c|}{Reserved (0)} | \multicolumn{4}{c|}{bCBWLUN} |
| 14 | \multicolumn{3}{c|}{Reserved (0)} | \multicolumn{5}{c|}{bCBWCBLength (16)} |
| 15 | \multicolumn{8}{c|}{wATACBSignature (2424h)} |
| 16 | | | | | | | | |
| 17 | 0 | \multicolumn{7}{c|}{bmATACBActionSelect} |
| 18 | \multicolumn{8}{c|}{bmATACBRegisterSelect} |
| 19 | \multicolumn{8}{c|}{bATACBTransferBlockCount} |
| 20 | | | | | | | | |
| 21 | | | | | | | | |
| 22 | | | | | | | | |
| 23 | \multicolumn{8}{c|}{bATACBTaskFileWriteData} |
| 24 | | | | | | | | |
| 25 | | | | | | | | |
| 26 | | | | | | | | |
| 27 | | | | | | | | |
| 28 | | | | | | | | |
| 29 | \multicolumn{8}{c|}{Reserved (0)} |
| 30 | | | | | | | | |

Fig. 9  ATACB

| Byte \ Bit | 7 | 6 | 5 | 4 | 3 | 2 | 1 | 0 |
|---|---|---|---|---|---|---|---|---|
| 0 | \multicolumn{8}{c}{dCBWSignature (43425355h)} |||||||| 
| 1 | | | | | | | | |
| 2 | | | | | | | | |
| 3 | | | | | | | | |
| 4 | dCBWTag | | | | | | | |
| 5 | | | | | | | | |
| 6 | | | | | | | | |
| 7 | | | | | | | | |
| 8 | dCBWTransferLength | | | | | | | |
| 9 | | | | | | | | |
| 10 | | | | | | | | |
| 11 | | | | | | | | |
| 12 | bmCBWFlags | | | | | | | |
| 13 | Reserved (0) | | | | bCBWLUN | | | |
| 14 | Reserved (0) | | | bCBWCBLength (16) | | | | |
| 15 | wATACBSignature (2424h) | | | | | | | |
| 16 | | | | | | | | |
| 17 | 1 | | bmATACBActionSelect | | | | | |
| 18 | bmATACBRegisterSelect | | | | | | | |
| 19 | bATACBTransferBlockCount | | | | | | | |
| 20 | bATACBDeviceHeadData | | | | | | | |
| 21 | Reserved (0) | | | | | | | |
| 22 | | | | | | | | |
| 23 | bATACBTaskFileWriteData | | | | | | | |
| 24 | | | | | | | | |
| 25 | | | | | | | | |
| 26 | | | | | | | | |
| 27 | | | | | | | | |
| 28 | | | | | | | | |
| 29 | | | | | | | | |
| 30 | | | | | | | | |

ATACB (bytes 15–30)

Fig. 10a

| Byte | ATACB2 |
|---|---|
| 0 | Signature |
| 1 | Subcommand |
| 2 | RegisterSelect(7:0) |
| 3 | ActionSelect1(7:0) |
| 4 | TransferBlockCount(3:0), ActionSelect2(11:8) |
| 5 | (1F6h) - Device Head |
| 6 | (1F1h) - Features |
| 7 | (1F2h) - M-Sector Count |
| 8 | (1F3h) - M-Sector Number |
| 9 | (1F4h) - M-Cylinder Low |
| 10 | (1F5h) - M-Cylinder High |
| 11 | (1F7h) - L-Sector Count |
| 12 | (1F3h) - L-Sector Number |
| 13 | (1F4h) - L-Cylinder Low |
| 14 | (1F4h) - L-Cylinder High |
| 15 | (1F7h) - Command |

Fig. 10b

ATA DEVICE CONTROL VIA A PACKET-BASED INTERFACE

This application is a continuation-in-part of U.S. patent application Ser. No. 09/671,554, filed Sep. 27, 2000, now U.S. Pat. No. 6,618,788, entitled "ATA DEVICE CONTROL VIA A PACKET-BASED INTERFACE".

FIELD OF THE INVENTION

This present invention relates to ATA (Advanced Technology Attachment) device control, and more particularly to systems and methods for interfacing a host with an ATA device using an intervening packet data channel.

BACKGROUND OF THE INVENTION

An "ATA" device is a data device that complies with an ANSI (American National Standards Institute) ATA standard, for instance the standard "AT Attachment with Packet Interface Extension—(ATA/ATAPI-4)" or one of its predecessors. Future ATA standards are also currently contemplated; devices compliant with these standards will also be "ATA devices". Most personal computers have built-in ATA device support, and most of these come equipped with ATA internal hard drives.

The ATA standards define the physical, electrical, transport, and command protocols for the internal attachment of devices to computers via an ATA bus. Referring to FIG. 1, a typical configuration for a computer 20 capable of using one or more ATA data devices is shown. A host processor 22 communicates with main memory 24 (e.g., a memory controller attached to one or more memory modules via a memory bus) over a frontside bus 28. Host processor 22 (and main memory 24) can also communicate with a variety of other system peripherals through PCI (Peripheral Component Interconnect) bridge 26 and PCI local bus 30.

The bandwidth on PCI local bus 30 can be shared by a variety of computer components, some of which are depicted in FIG. 1. For instance, internal PCI-compliant devices such as modems, sound cards, video cards, etc. can be attached to computer 20 via PCI card slots 32 and 34 (the number of available slots varies from computer model to computer model) on the computer motherboard. In addition, USB (Universal Serial Bus) interface 36 provides a number of USB ports 38 for the attachment of a wide variety of external devices, such as a mouse, a keyboard, a digital camera, audio devices, printers, etc. And ATA host adapter 40 performs signal conversion between PCI local bus 30 and yet another bus, ATA bus 42.

ATA bus 42 is typically implemented as a multi-drop bus using a flexible 40-conductor cable having three 40-pin connectors, each of which can mate to a corresponding socket on the computer's motherboard or on an ATA device (the ATA devices themselves mount within the computer case). Up to two ATA devices (e.g., devices 44 and 46 on FIG. 1) can share ATA bus 42. The primary device is known as device 0, or the "master" when two devices are present. The secondary device is known as device 1, or the "slave". For most ATA operations, only one of devices 44 and 46 will respond to the host's commands, that device being the one corresponding to the state of the "DEV" bit in the Device/Head Register (to be discussed shortly).

FIG. 2 illustrates several concepts related to ATA communication between an ATA host and an ATA device. ATA bus 42 uses an asynchronous interface protocol. Bus 42 comprises a 16-bit data bus 52, used to transfer storage data and register values to and from ATA device 44. Five-bit register addressing bus 54 is used by the host to tell device 44 which register's contents are to be accessed. Device signals 56 and host signals 58 are used to indicate when bus contents are valid, to indicate whether a register access is a read or a write, to synchronize transfers, and to perform device resets.

All communications with a traditional ATA device 44 take place via register-delivered commands. Within device 44, a device controller 50 maintains a set of registers. In FIG. 2, this set of registers has been arranged in three groups: write-only registers 60 (registers that can only be written by the host); read-only registers 62 (registers that can only be written by the device); and read/write registers 64. A register-delivered command is executed whenever the host writes to the Command register. For instance, the READ MULTIPLE command causes multiple sectors to be read from the device in PIO data-in mode (Programmed Input/Output mode data transfers are performed by the host processor utilizing programmed register accesses to the Data register). To perform a READ MULTIPLE command, the host places the number of data sectors to be transferred in the Sector Count register, the starting sector number in the Sector Number register, the starting cylinder number in the Cylinder High/Cylinder Low registers, and the device number and starting head number in the Device/Head register. The READ MULTIPLE command code (C4h) is then written to the Command register, causing ATA device 44 to evaluate the other register's contents and perform the requested read.

Device 44 indicates the status of the command using the bit fields of the Status register. If an error occurs, device 44 will report on the error using the Error register and several other registers. Note that it is the host's job to read the registers and ascertain the status of the device.

The ATA standard includes an alternative to register-delivered commands that is better suited to devices such as CD-ROM and tape devices. The ATAPI (ATA Packet Interface) specifies a method for controlling a storage device over an ATA bus using packet-delivered commands. Although an ATAPI device and an ATA device can share an ATA bus, a single device cannot identify itself simultaneously as both an ATA device and as an ATAPI device. An ATAPI device supports a very small subset of the traditional ATA command set—for most of its functions, an ATAPI device receives ATAPI packet-delivered transport protocol commands. An ATAPI packet is received by the device as data upon receipt by the device of the ATA ATAPI-specific PACKET command in the Command register.

The ATAPI transport protocol, like traditional ATA, was designed for use with internally-mounted drives and with a host that places ATAPI packets directly on the ATA bus. But because most functions of an ATAPI device can be exercised using ATAPI packets, methods have now been devised to use an intermediate transport protocol and a different physical transport media—those provided by USB—to allow external connection of an ATAPI device to a host computer. This method relies only on the packet-delivered commands of ATAPI to communicate with an ATAPI device. FIG. 3 illustrates a communication stack 70 that operates according to such a method.

In FIG. 3, a physical device 90, which includes an ATAPI device 100, physically connects to a host 80 via a USB PHY connection 99, e.g., a USB cable or an intervening USB hub. When host 80 executes an ATAPI function on ATAPI device 100, host 80 calls ATAPI driver 82. ATAPI driver 82 sends an appropriate ATAPI transport protocol command, along with an indication as to the amount of data (if any) that is expected to be transferred and an indication of the "Logical Unit" that is to be addressed, to MSC (Mass Storage Class) driver 84.

Logically, MSC driver 84 communicates with MSC logical device 96 on physical device 90 to transport the ATAPI command packet and data between host 80 and physical device 90. Together, driver 84 and logical device 96 operate according to the specification "Universal Serial Bus Mass Storage Class—Bulk-Only Transport", Rev. 1.0, USB Implementers Forum, Sep. 31, 1999. According to this specification, two USB logical pipes (Bulk-In Pipe 110 and Bulk-Out Pipe 112) are established between the two USB endpoints (in addition to the Default Pipe 114 that exists between USB driver 86 and USB logical device 94). The two devices pass MSC-formatted command and data packets over these two logical pipes. Physically, driver 84 and logical device 96 communicate via the USB PHY 99 that is established between USB host controller 88 (on host 80) and USB bus interface 92 (on device 90).

ATAPI command execution proceeds in three MSC steps, as shown in flowchart 120 of FIG. 4. The ATAPI transport protocol packet is encapsulated in an MSC-valid and -meaningful command block wrapper (CBW) at command transport step 122. Using bulk-out pipe 112, the CBW is communicated to MSC logical device 96. Then, if the host is writing data to the storage device, data-out block 124 transfers the data to MSC logical device 96 over bulk-out pipe 112. Or, if the host is reading data from the storage device, data-in block 126 transfers the data to MSC driver 84 over bulk-in pipe 110. Finally, in status transport step 128, MSC logical device 96 transfers a command status wrapper (CSW) back o MSC driver 84, indicating that the command has completed.

Returning to FIG. 3, two additional blocks, ATA host 97 and ATA interface 98, complete the communication path to ATAPI device 100. ATA host 97 issues ATA PACKET commands to ATAPI device 100, and then controls transfer of ATAPI command packets and data between ATAPI logical host 96 and ATAPI device 100. ATA interface 98 provides the low-level timing, handshaking, and signal-driving necessary to communicate with ATAPI device 100 over ATA PHY 101.

SUMMARY OF THE INVENTION

ATA devices, such as mass storage units, have increasingly larger storage sizes that use larger configuration register sizes. A command block format allows the USB/ATA bridge circuit to be used with ATA devices with larger registers and at the same time operates with earlier ATA command block formats.

The foregoing and other objects, features and advantages of the invention will become more readily apparent from the following detailed description of a preferred embodiment of the invention, which proceeds with reference to the accompanying drawings.

BRIEF DESCRIPTION OF THE DRAWINGS

The invention may be best understood by reading the disclosure with reference to the drawings, wherein:

FIGS. 9, 10*a* and 10*b* show command block wrapper formats useful with embodiments of the invention;

DETAILED DESCRIPTION OF THE PREFERRED EMBODIMENTS

Figure 5:
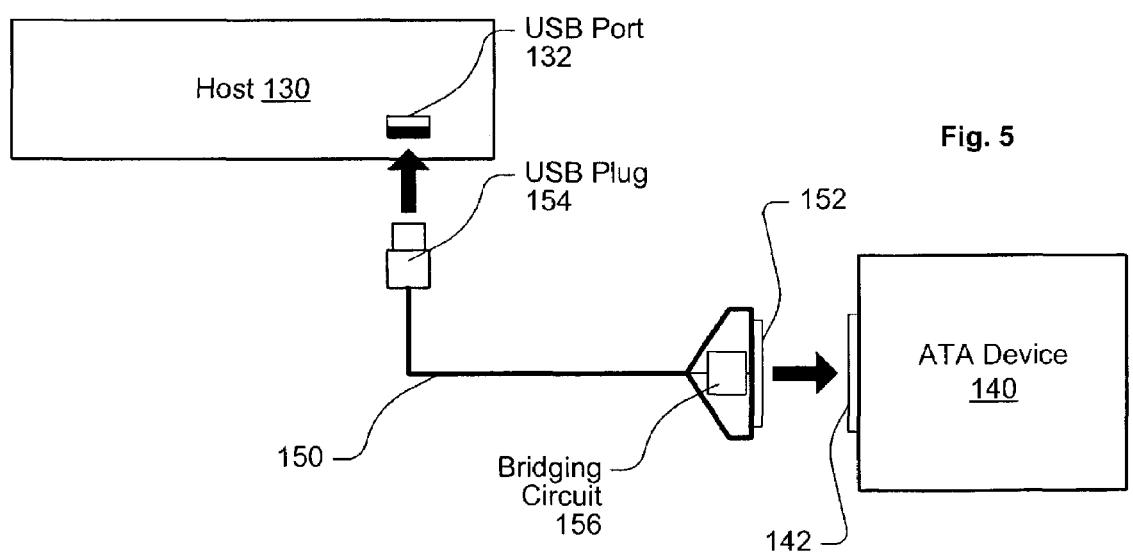
FIGS. 5 and 6 illustrate two computer/external ATA device configurations according to embodiments of the invention.
Figure 6:
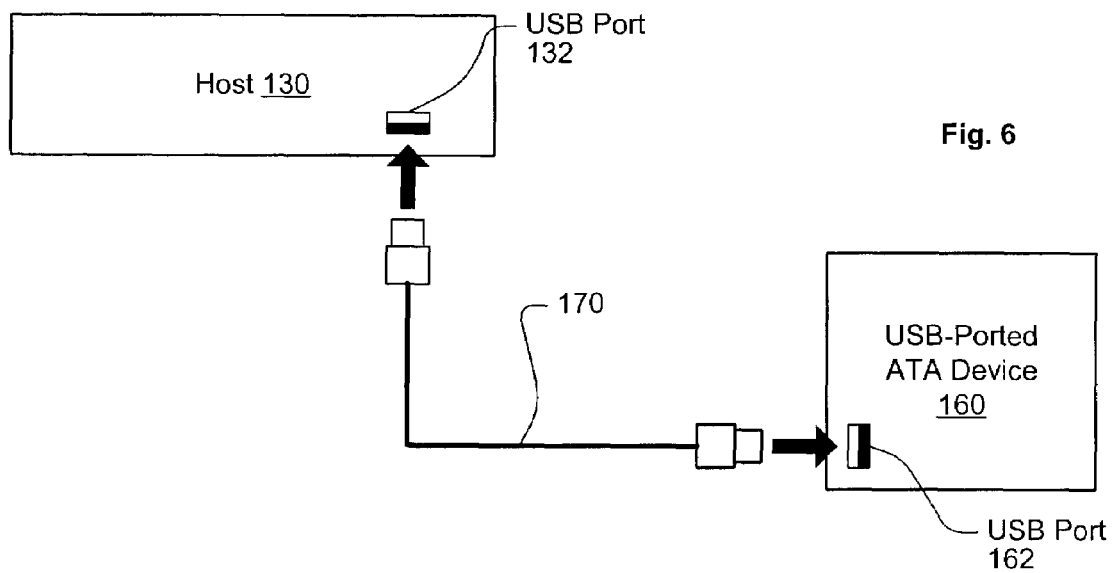

A contemplated use of the present invention is for control of an ATA device from a host connected to the device by a packet-based connection. FIGS. 5 and 6 depict two possible configurations according to this use. In FIG. 5, a host 130 connects to an ATA device 140 via a "smart cable" 150. In FIG. 6, a host 130 connects to a USB-ported ATA device 160.

Referring first to FIG. 5, host 130 contains USB host and ATA host drivers, and provides a USB upstream port 132. ATA device 140 can be a traditional ATA device with a socket 142. Although the socket can be an ATA socket, a more durable socket that can be locked to a connector and can hold up under repeated connect/disconnect cycles is preferable. Likewise, ATA device 140 will preferably be placed in some type of protective enclosure, and may come with its own power supply. And although the following discussion will focus on a single ATA DEV0, ATA device 140 could also incorporate two physical devices, one functioning as DEV0 and the other as DEV1 on the same ATA bus.

Smart cable 150 provides a bridging function between the USB and ATA formats. Cable 150 has a connector 152 at one end, adapted to mate to socket 142 on device 140. On the opposite end, cable 150 has an upstream USB plug 154. A bridging circuit 156 mounts in the connector housing for connector 152. To the USB host, smart cable 150 appears as a bus-powered USB function (although it may alternately be self-powered or receive power from connector 152). To ATA device 140, smart cable 150 appears to be an ATA host adapter.

FIG. 6 shows a configuration that uses a standard USB cable 170 and a USB-ported ATA device 160. In this second configuration, host 130 can be provisioned identically to the first configuration. But bridging circuit 156 of FIG. 5 has been physically incorporated into ATA device 160. Typically, device 160 will appear to the USB host as a self-powered USB function, unless the power requirements of device 160 are such that a bus-powered implementation is feasible.

Figure 7:
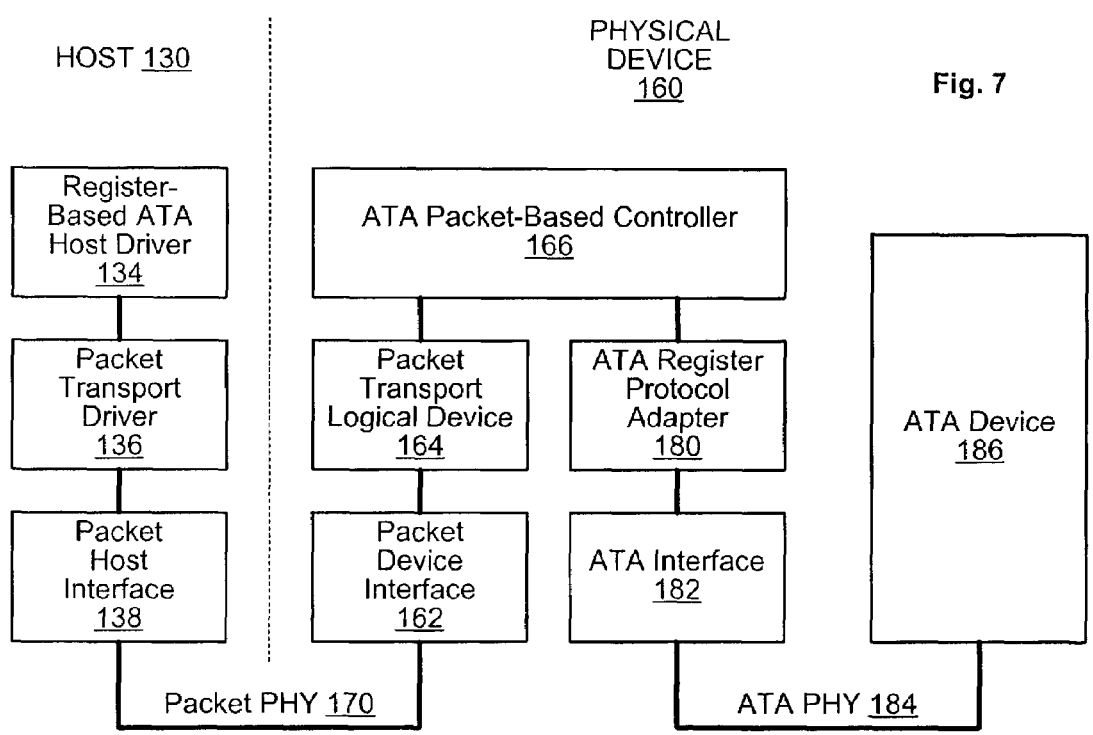
FIG. 7 shows a communication stack for a general embodiment of the invention.

FIG. 7 shows a generalized communication stack useful with the configurations depicted in FIGS. 5 and 6 (the numbering shown is for FIG. 6, although FIG. 7 is equally applicable to FIG. 5). On the host side, a register-based ATA host driver 134 has functionality comparable to that of an ATA driver used with an onboard ATA bus. Additionally, driver 134 understands how to construct ATA command blocks (to be described shortly) and possibly deconstruct returned register packets in order to perform register-delivered ATA transactions.

Packet transport driver 136 provides the capability for reliable transport of command and data packets across packet PHY 170. Packet host interface 138 provides link-layer connectivity to physical device 160.

On the physical device side, packet device interface 162 provides link-layer connectivity and packet transport logical device 164 provides transport layer capability. Logical device 164 interfaces with ATA packet-based controller 166 to provide controller 166 connectivity to register-based ATA host driver 134.

ATA packet-based controller 166 interprets and acts on ATA command blocks from register-based ATA host driver 134. In other words, controller 166 provides the main packet-to-register ATA command bridging functionality. When controller 166 receives an ATA command block, it recognizes the command block as such, checks it for inconsistencies, and parses it into a sequence of ATA register accesses. The ATA register access sequence is delivered to ATA register protocol adapter 180 for execution. In data output cases, register protocol adapter 180 will hand data to controller 166 for ATA delivery. In data input or register-read cases, register protocol adapter 180 will return register data to controller 166 for packet delivery back to host driver 134.

ATA register protocol adapter 180 contains the functionality necessary for asynchronous communication with ATA device 186. This includes low-level services for register access and related signaling. ATA interface 182 provides drivers and buffers to generate and read ATA-level signals on ATA PHY 184.

Figure 8:
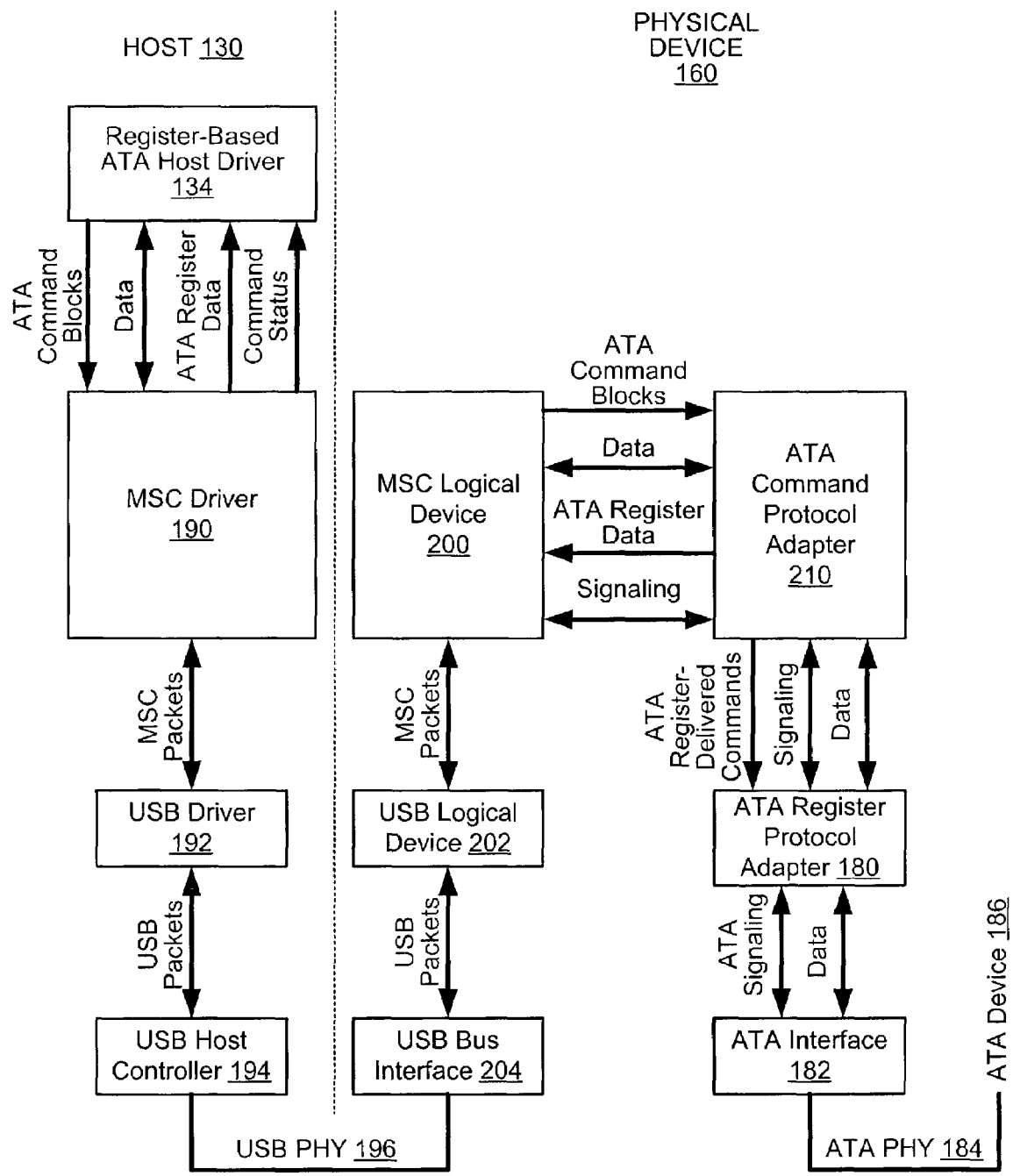
FIG. 8 shows a communication stack for a USB MSC embodiment of the invention.

FIG. 8 shows a more specific communication stack for use with a USB packet PHY and a USB Mass Storage Class-type driver. Register-based ATA host driver 134 provides an ATA command block (ATACB, to be discussed shortly) and write data (if applicable) to MSC driver 190. MSC driver 190 places each ATACB in a command block wrapper (CBW) and sends it to MSC logical device 200 using an MSC bulk-out pipe (not shown). MSC logical device 200 removes the ATACB from the CBW, recognizes the ATACB as such, and sends it to the ATA command protocol adapter 210. ATA command protocol adapter 210 performs the requested register-delivered commands/register accesses, and returns any resulting register/media data to MSC logical device 200. When the transaction requested in the ATACB is complete, adapter 210 provides a status signal back to logical device 200, which constructs a command status wrapper (CSW) and transmits the status back to MSC driver 190 (and, consequently, driver 134).

FIG. 9 shows one preferred format for a command block wrapper MSC packet-including an ATA command block-according to an embodiment of the invention. The CBW is 31 bytes long. Bytes 0–14 are filled in by MSC driver 190; Bytes 15–30 are copied from the ATACB supplied by ATA host driver 134.

The first field (bytes 0–3) is a command block wrapper signature field containing a specific signature dCBWSignature that helps identify the data packet as a CBW. The next field (bytes 4–7) contains a command block tag dCBWTag. This tag identifies a particular command block, and will be echoed back to driver 190 in the Command Status Wrapper (CSW) when the command completes. Bytes 8–11 contain a value dCBWTransferLength representing the number of bytes of data that the host expects to transfer on the Bulk-In or Bulk-Out endpoint during the execution of the command. Byte 12 contains a collection of bit-mapped flags bmCBW-Flags. The only bit currently used is bit 7, the Direction bit. When data is to be transferred during the execution of the command, Direction is set to 0 when the data will flow on the Bulk-Out pipe to the ATA device, and is set to 1 when the data will flow on the Bulk-In pipe to the host. Bits 0–3 of byte 13 contain a logical unit number bCBWLun that may be useful in an implementation where the command block interpreter serves more than one logical unit. Bits 0–5 of byte 14 contain a length value bCBWCBLength—this value indicates the number of valid bytes in the following command block, and may be any number between 1 and 16, inclusive. For instance, the command block in FIG. 9 is 16 bytes long (although the last three bytes are unused); thus, bCBWCBLength will always be set to 16 for a command block in this format.

Bytes 15–27 contain the ATACB-specific fields for an ATA command block. An ATA command block is distinguished from other types of command blocks by its first two bytes (bytes 15–16), which contain the signature wATACB-Signature (in this embodiment the signature is always set to 2424h, where "h" represents hexadecimal notation). Only command blocks that have this signature can be interpreted as ATA command blocks.

Byte 17 contains a set of bit-mapped execution flags bmATACBActionSelect. The definition of each bit is shown in Table 1. In general, these bits define how the bridging device is to interpret and execute the commands/register accesses that follow.

TABLE 1

Figure 12A:
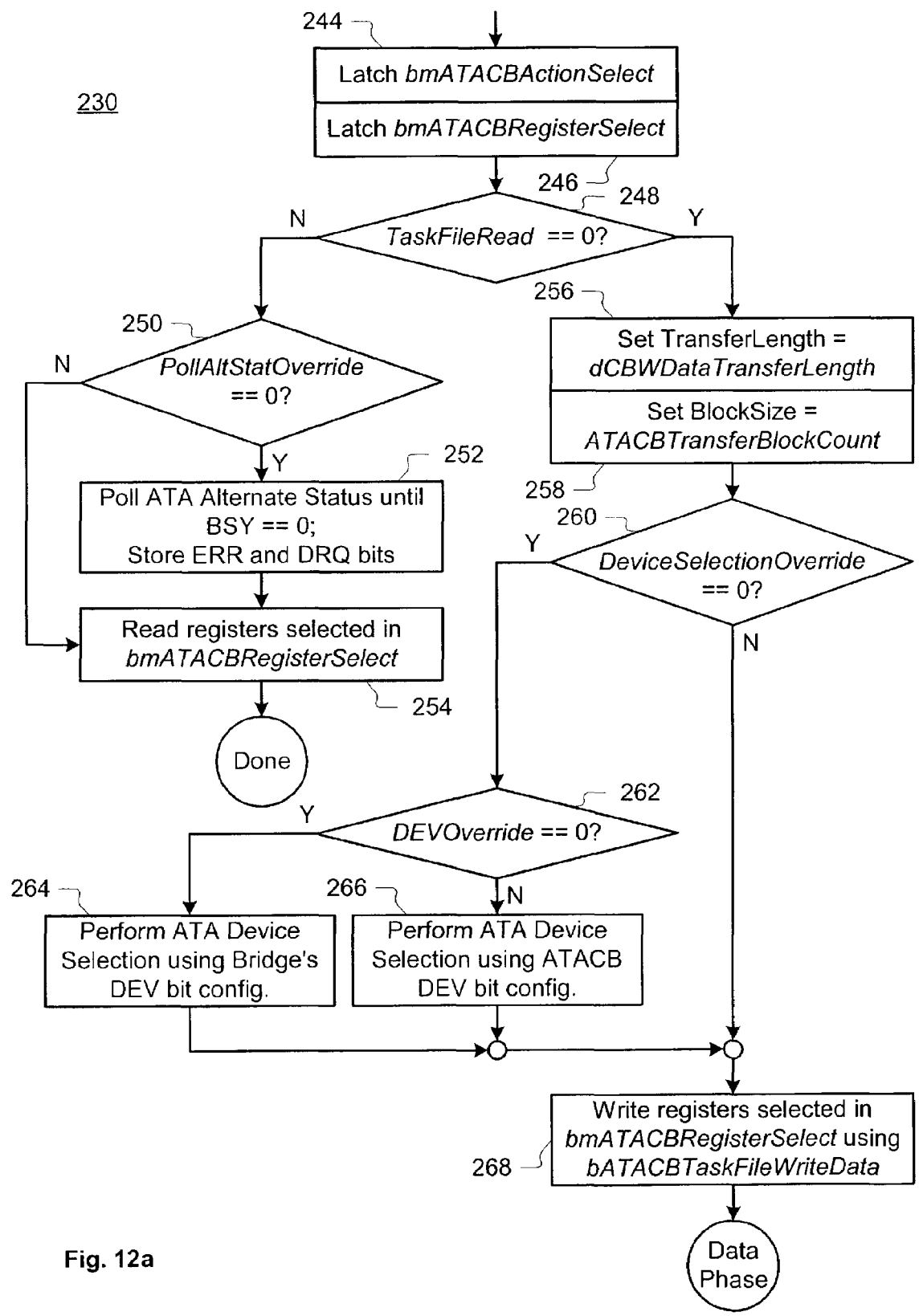
FIGS. 12*a*, 12*b*, and 12*c* show a flowchart for one method of operating a USB-ATA bridge according to an embodiment of the invention.
Figure 12B:
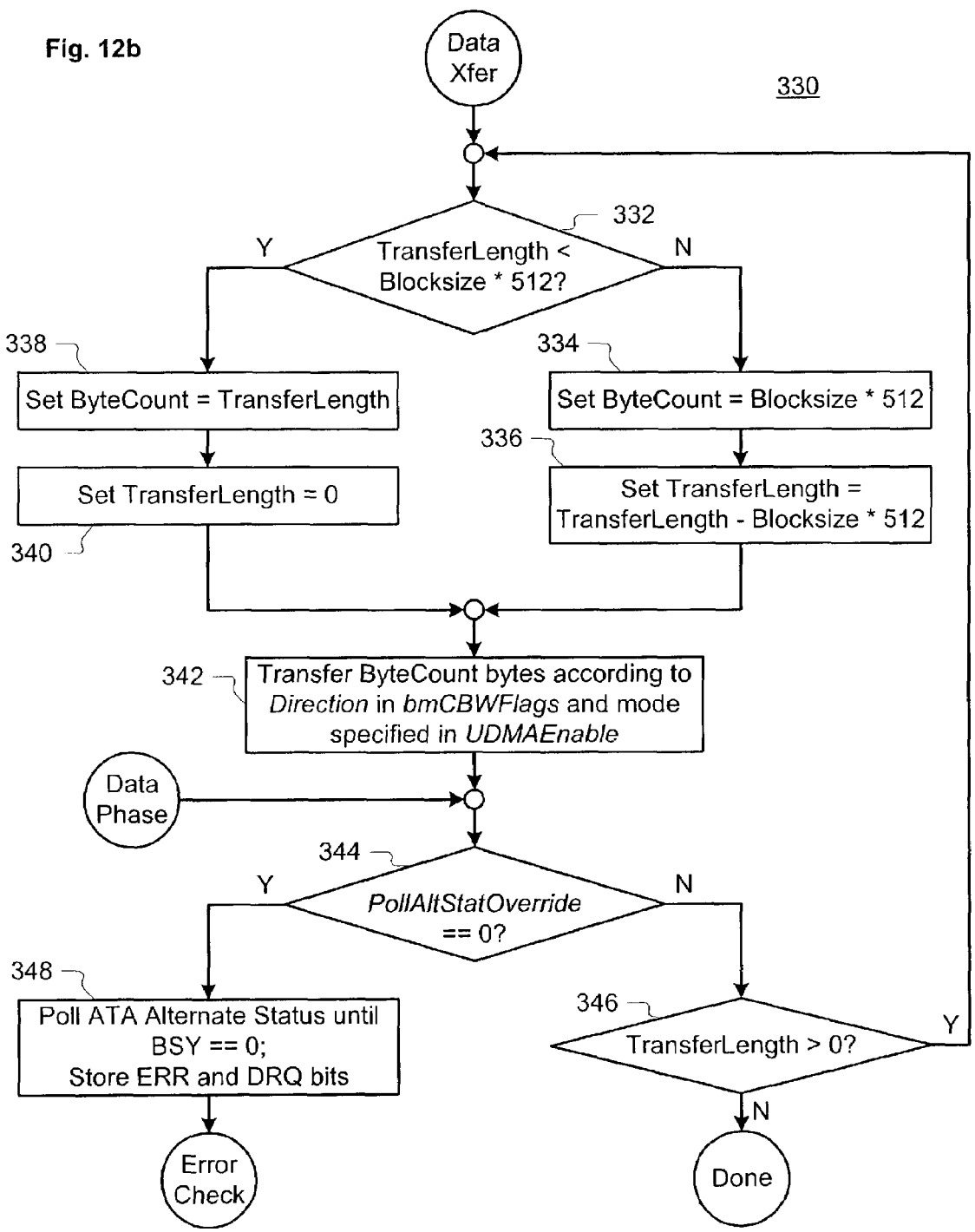
Figure 12C:
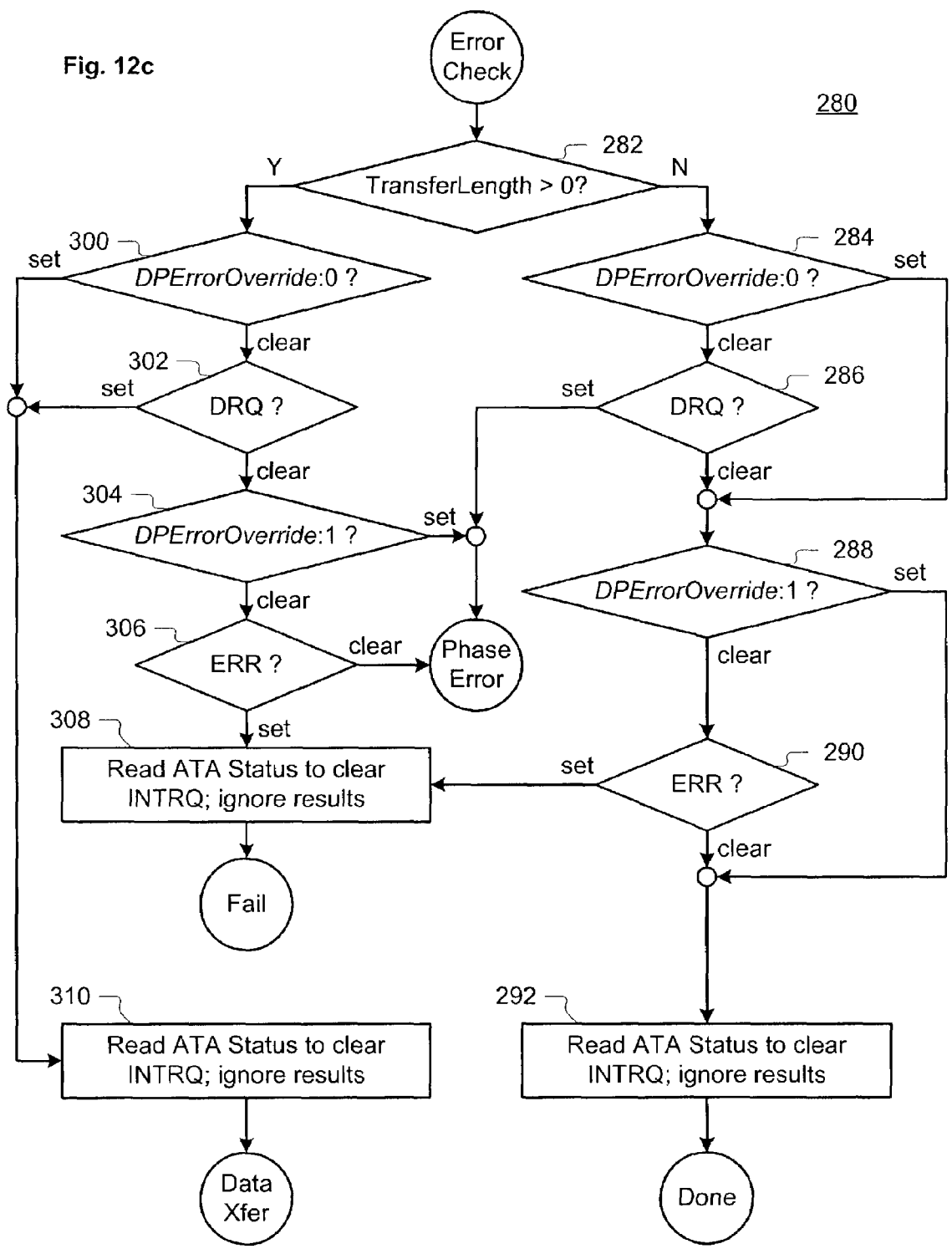

| Bit | Name | Function |
|---|---|---|
| 0 | TaskFileRead | Read and return the task file register data selected in bmATACBRegisterSelect. If TaskFileRead is set, the dCBWDataTransferLength field must be set to 8. 0 = Execute ATACB command using values set in bATACBTaskFileWriteData and perform data transfer (if any). 1 = Only task file registers selected in bmATACBRegisterSelect are read. Task file registers not selected in bmATACBRegisterSelect shall not be accessed and 00h is returned for the unselected register data. |
| 1 | DeviceSelection Override | This bit shall not be set in conjunction with bmATACBActionSelect TaskFileRead. 0 = Device selection is performed prior to command register write accesses. 1 = Device selection shall not be performed prior to command register write accesses. |
| 2 | PollAltStatOverride | 0 = The Alternate Status register is polled until BSY = 0 before proceeding with the ATACB operation. 1 = Execution of the ATACB shall proceed with the data transfer without polling the Alternate Status register until BSY = 0. |
| 3–4 | DPErrorOverride | Device and Phase Error Override. These bits shall not be set in conjunction with bmATACBActionSelect TaskFileRead. The order of precedence for error override is dependent on the amount of data left to transfer when the error is detected, as depicted in FIG. 12c. 00 = Data accesses are halted if a device or phase error is detected. 01 = Phase error conditions are not used to qualify the occurrence of data accesses. 10 = Device error conditions are not used to qualify the occurrence of data accesses. 11 = Neither device error nor phase error conditions are used to qualify the occurrence of data accesses. |
| 5 | DEVOverride | Use the DEV value specified in the ATACB. 0 = The DEV bit value will be determined from an internal configuration bit. 1 = Then DEV bit value will be determined from the ATACB(11 bit 5). |

TABLE 1-continued

| Bit | Name | Function |
|---|---|---|
| 6 | UDMAEnable | 0 = Use PIO mode for data transfers.<br>1 = Use Ultra DMA for data transfers. |
| 7 | ATACBFormat | Indicates which ATACB format is used for this CB.<br>0 = Original ATACB format.<br>1 = Alternate ATACB format. |

Byte 18 contains a set of bit-mapped register flags bmATACBRegisterSelect. The definition of each bit is shown in Table 2. When the command block is writing register values to the device, bmATACBRegisterSelect indicates which registers are to be written. Similarly, when the command block is requesting a read from device registers, bmATACBRegisterSelect indicates which registers are to be read. Register accesses occur in the sequential order shown (bit 0 first). If a register is unselected, the value 00h should be returned for that register.

TABLE 2

| Bit | Read Register<br>(TaskFileRead == 1) | Write Register<br>(TaskFileRead == 0) |
|---|---|---|
| 0 | Alternate Status | Device Control |
| 1 | Error | Features |
| 2 | Sector Count | Sector Count |
| 3 | Sector Number | Sector Number |
| 4 | Cylinder Low | Cylinder Low |
| 5 | Cylinder High | Cylinder High |
| 6 | Device/Head | Device/Head |
| 7 | Status | Command |

Byte 19 contains the value bATACBTransferBlockCount. For multiple-block access commands, this value should be set to the value last used for "Sectors per block" in the "SET_MULTIPLE_MODE" ATA command. For other commands, this value should be set to 1, indicating a block size of 512 bytes. Valid values are 1, 2, 4, 8, 16, 32, 64, 128, and 0 (which maps to 256). If the bridge detects any other value here, command failed status will be returned to the host.

Bytes 20–27, bATACBTaskFileWriteData carry write data when the ATACB requests that the ATA device registers are to be written to. The byte order corresponds to the bit order defined for byte 18, i.e., byte 20 corresponds to bit 0 of bmATACBRegisterSelect, and thus carries the value for the Device Control register, etc. A particular byte need not contain a valid register value if its corresponding bmATACBRegisterSelect bit value is 0.

FIG. 10a shows an alternate command block wrapper format. This format is similar to FIG. 9, with a few changes. First, bit 7 of byte 17 is set to 1, indicating that this command block is in the alternate format. Second, a new field, bATACBDeviceHeadData, has been inserted at byte 20. This field replaces the Device/Head register field of bATACBTaskFileWriteData operationally, although the replaced field remains as an unused placeholder in the command block structure. The third format change is that bATACBTaskFileWriteData shifts to the end of the CBW (bytes 23–30).

The alternate format can be advantageous in several situations. First, it can be used with either a register read or a register write where the device is selected by the command block (DeviceSelectionOverride must be set to 0 for this to occur), whereas by definition the first format cannot perform device selection when registers are to be read. Second, since the bATACBDeviceHeadData value is positioned forward in the command block, a state machine bridging implementation can begin the device-setting operation before receiving bATACBTaskFileWriteData, thus simplifying state machine operation and improving response time.

FIG. 10b shows an alternative ATA Command Block 2 (ATACB2) used for extended ATA device register configurations. In one example, the ATACB2 is used for 48 bit ATA device register configurations. However, this new command block format can be used for other register configuration sizes. Bytes 0–15 in FIG. 10b correspond to bytes 15–30 in FIGS. 9 and 10a. Some differences between the command block shown in FIGS. 9 and 10a and the ATACB2 shown in FIG. 10b include a subcommand field in byte 1 that identifies the command block as ATACB2, or some other type of command block.

The ActionSelect field (byte 3) is located after the RegisterSelect field (byte 2). The RegisterSelect field is similar to that shown in Table 2. The TransferBlockCount field (byte 4) is compressed to 4 bits. This allows 4 additional bits in the previous TransferBlockCount field to be used as bits (11:8) in an ActionSelect2 field. Both a most significant byte (M) and a least significant byte (L) are provided for the sector count, sector number, cylinder high, and cylinder low in the TaskFileWrite field (bytes 7–15).

The ATACB2 in FIG. 10b is distinguished from other vendor specific command blocks by byte 0 of the command block matching the configurable value for the Signature field. This Signature field indicates the command block contains a vendor specific command block further determined by the Subcommand field in byte 1. Any command blocks that do not match this value are passed on as a normal block command to the device.

The Subcommand field in byte 1 indicates an ATACB2 when it is set to a predefined value. Another predefined value in the Subcommand field indicates the ATACB shown in FIG. 9 or FIG. 10a. Command blocks that do not match either of these values are passed on as a normal block command to the ATA device.

Figure 1:
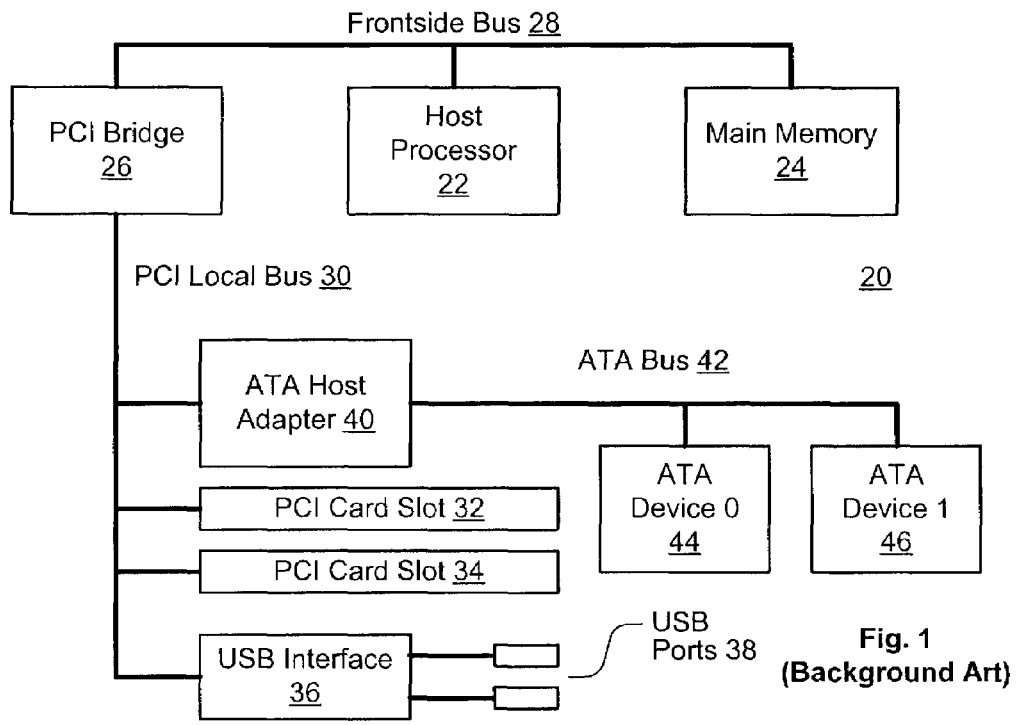
FIG. 1 illustrates a block diagram for a background art computer configuration.
Figure 2:
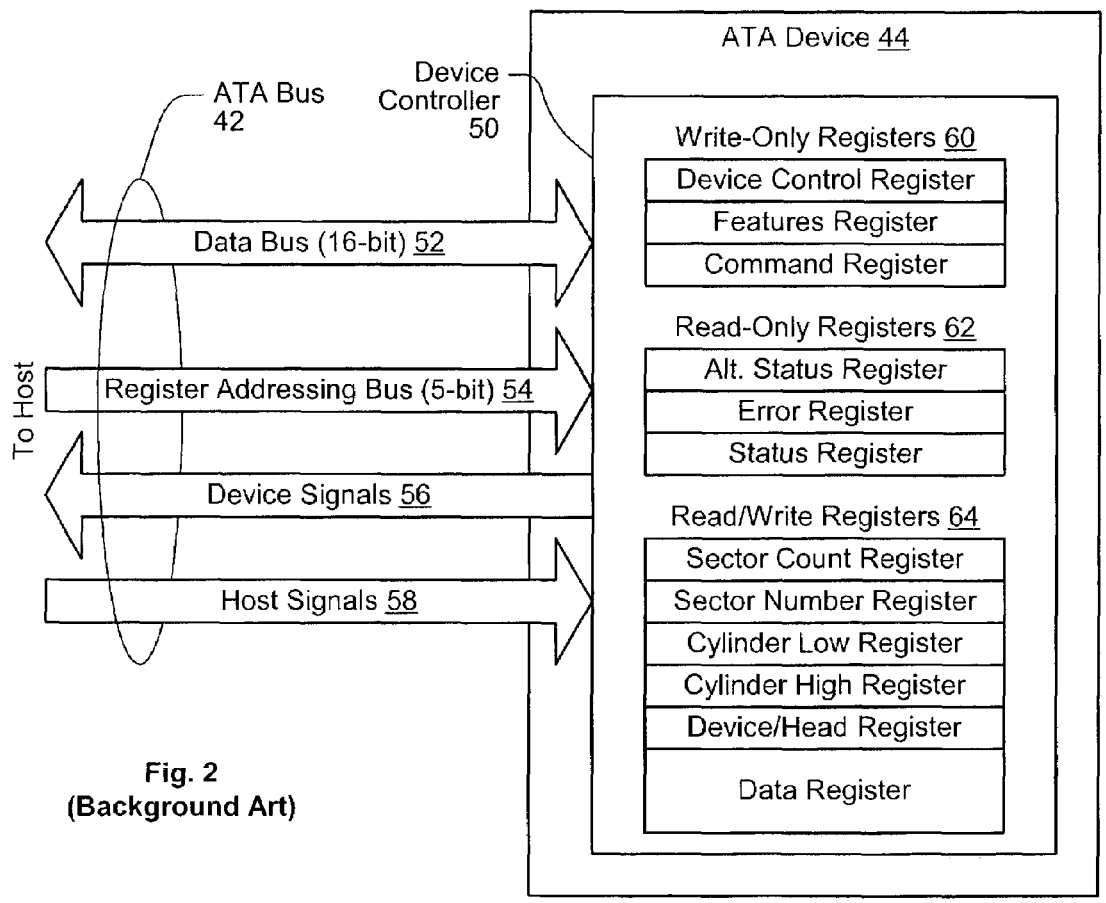
FIG. 2 shows the main signal groups of an ATA bus and registers of an ATA device.
Figure 3:
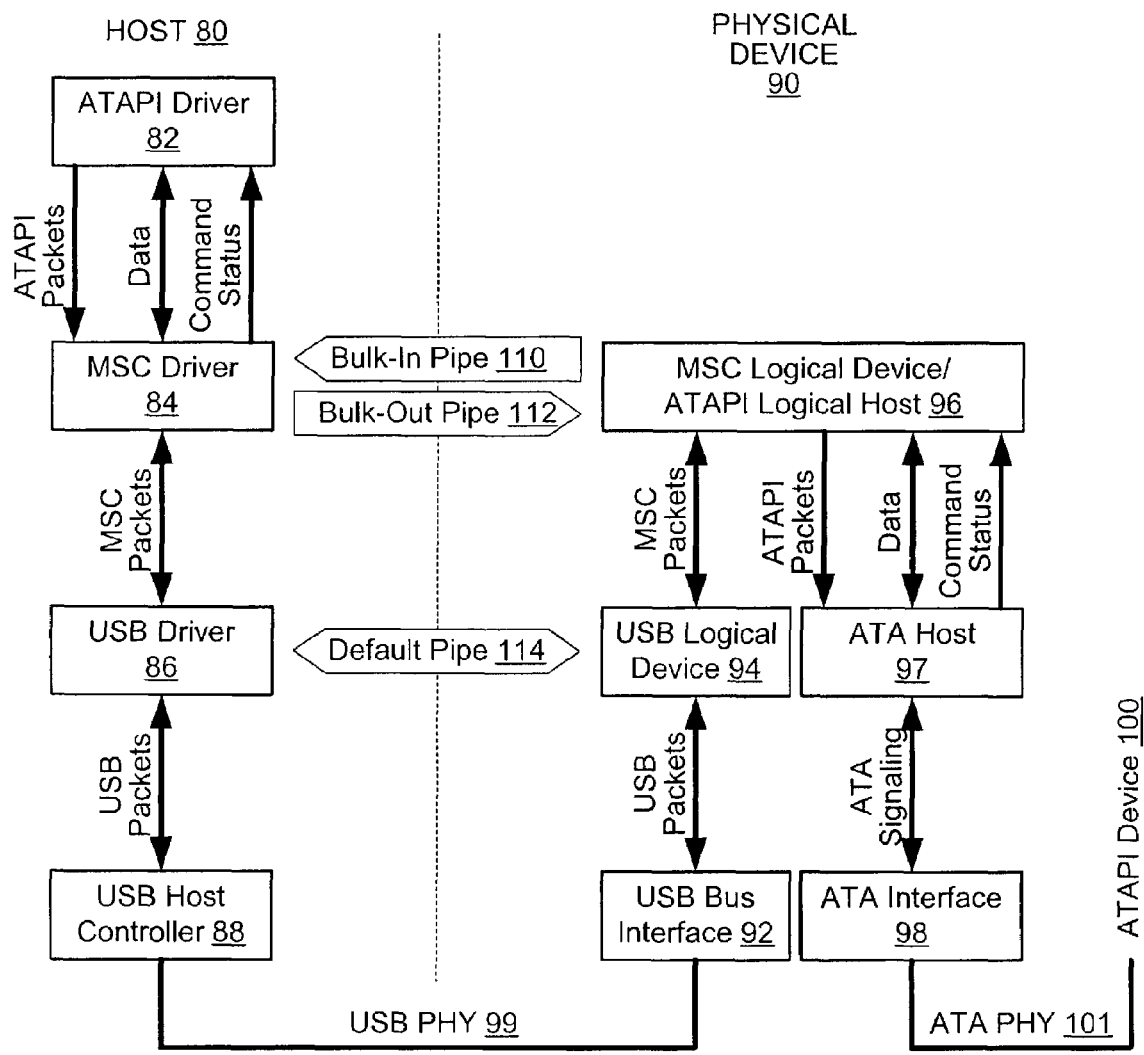
FIG. 3 shows a communication stack for a background art method of controlling an ATAPI device over a USB connection.
Figure 4:
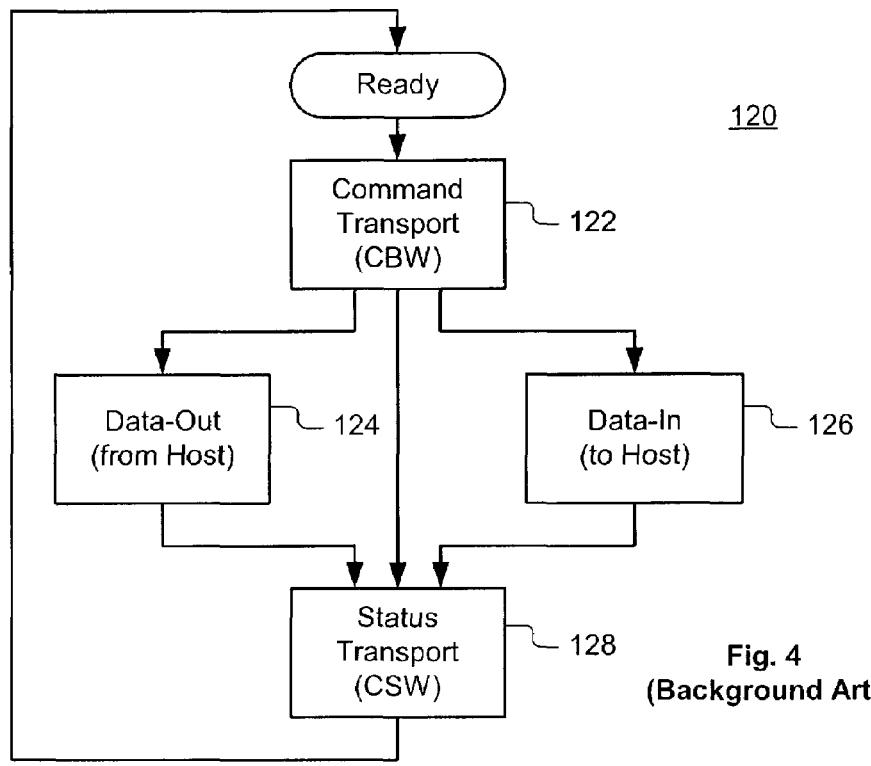
FIG. 4 shows the communication states of a USB MSC transaction.

Setting the appropriate bits in the RegisterSelect field cause a Taskfile read or Taskfile write register access to occur. Bit 0 of the RegisterSelect field has no effect for Taskfile writes because the Device Control register (FIG. 2) can not be written via ATACB2. However bit 0 of the RegisterSelect field does control whether or not the Alternate Status Register is read during Taskfile reads. In one example, Taskfile read data is 12 bytes in length. Unselected Taskfile register data is returned as 00h. Taskfile register accesses occur in sequential order (Bit 0 first, Bit 7 last).

Table 3 shows the format for a register read resulting payload. The sector count, sector number cylinder low, and cylinder high bits are expanded to identify a most significant byte (M) and a least significant byte (L).

TABLE 3

| Byte | Register Read Resulting Payload |
|---|---|
| 0 | (3F6h) - Alternate Status |
| 1 | (1F6h) - Device Head |
| 2 | (1F1h) - Error |
| 3 | (1F2h) - Sector Count -M |
| 4 | (1F3h) - Sector Number -M |
| 5 | (1F4h) - Cylinder Low -M |
| 6 | (1F5h) - Cylinder High -M |
| 7 | (1F2h) - Sector Count -L |
| 8 | (1F3h) - Sector Number -L |
| 9 | (1F4h) - Cylinder Low -L |

TABLE 3-continued

| Byte | Register Read Resulting Payload |
|---|---|
| A | (1F5h) - Cylinder High -L |
| B | (1F7h) - Status |

Table 4 shows bit fields of the ActionSelect1 and ActionSelect2 registers in bytes 3 and 4 of the ATACB2 in FIG. 10b. Refer to the ATACB2 Command Flow in FIGS. 13a–13c for further clarification.

TABLE 4

| Bit | Name | Function |
|---|---|---|
| Bit 0 | TaskFileRead | Read and return the task file register data selected in bmATACB2RegisterSelect. If TaskFileRead is set, the dCBWDataTransferLength field must be set to 12.<br>0 = Execute ATACB2 command and data transfer (if any).<br>1 = Only task file registers selected in bmATACB2RegisterSelect is read. Task file registers not selected in bmATACB2RegisterSelect shall not be accessed and 00h is returned for the unselected register data. |
| Bit 1 | DeviceSelectionOverride | Device Selection Override.<br>0 = Device selection is performed prior to any other reads or writes of the taskfile.<br>1 = Device selection shall not be performed prior to any other read or writes of the taskfile.<br>This bit applied to more points on the flow as compared to the original ATACB. |
| Bit 2 | PollAltStatOverride | Poll ALTSTAT Override.<br>0 = The Alternate Status register is polled until BSY = 0 before processing with the ATACB2 operation.<br>1 = Execution of the ATACB2 shall proceed without polling the Alternate Status register until BSY = 0.<br>This bit applied to more points on the flow as compared to the original ATACB. |
| Bit 3 | PErrorOverride | Phase Error Override. This bit shall not be set in conjunction with bmATACB2ActionSelect TaskFileRead. The order of precedence for error override is dependant on the amount of data left to transfer when the error is detected, as depicted in the ATACB2 Command Flow diagram at the end of this document. |
| Bit 4 | DErrorOverride | Device Error Override. This bit shall not be set in conjunction with bmATACB2ActionSelect TaskFileRead. The order of precedence for error override is dependant on the amount of data left to transfer when the error is detected, as depicted in the ATACB2 Command Flow diagram at the end of this document. |
| Bit 5 | DEVOverride | Use the DEV value specified in the ATACB2.<br>0 = The DEV bit value will be determined from an internal configuration bit.<br>1 = Then DEV bit value will be determined from bATACB2DeviceHeadData(5). |

TABLE 4-continued

| Bit | Name | Function |
|---|---|---|
| Bit 6 | UDMACommand | Ultra DMA Data Transfer Enable (Multi-word DMA not supported). Setting UDMA Command with non-UDMA capable devices or using it with non-UDMA commands will cause undetermined behavior.<br>0 = Do not use UDMA data transfers (PIO transfers only.)<br>1 = Use UDMA for data transfers. |
| Bit 7 | IdentifyDevice | ATA/ATAPI Identify Packet Device Command. Setting IdentifyDevice indicates the data phase will contain ATAPI (A1h) or ATA (ECh) IDENTIFY device data. Setting IdentifyDevice when the data phase is not IDENTIFY data will cause undetermined device behavior.<br>0 = Normal operation.<br>1 = Data phase of command will contain ATAPI or ATA IDENTIFY data, allowing the device to parse data for required device information. |
| Bit 8 | 48-bit | Write 1F2–1F5 with "-M" data or Read 1F2–1F5 with HOB = 1<br>0 = Do not read or write 1F2–1F5 with M data.<br>1 = Do read or write 1F2–1F5 with M data. |
| Bits 11–9 | Reserved | Reserved |

The TransferBlockSize field is compressed by changing from an 8-bit power of-two exponential to a 4-bit exponential (2^4 bit exponential). This value denotes the maximum DRQ block size in 512 byte sectors. The value of this variable is the number of bits to shift '1' to the left to calculate the number of sectors. Valid values are from 0 (1 sector per block) to 8 (256 sectors per block). Command failed status shall be returned if an invalid value is detected in the ATACB2. For commands using multiple sector PIO data transfer, the number of sectors per block should equal the current Multiple Sector Setting of the drive. Non-multiple non-UDMA commands set this value to 0 (block size of 512 bytes).

The Device Head field in byte 5 of FIG. 10b is used when writing the Device Head register when bit 6 in the RegisterSelect field is set (see Table 2). Otherwise the value written in the Device Head register is determined by the bridge. The DEV bit is not used unless DEVOverride bit is set. The DEV bit is bit 4 in both the Device/Head register and byte 5 in FIG. 10b.

A TaskFileWriteData in bytes 5–15 in FIG. 10b is used on ATA command or PIO write operations (register writes). Only data entries that have the associated RegisterSelect bit set should have valid data. Note in one implementation a value is written to the Device Control register using the original ATACB format.

Figure 11:
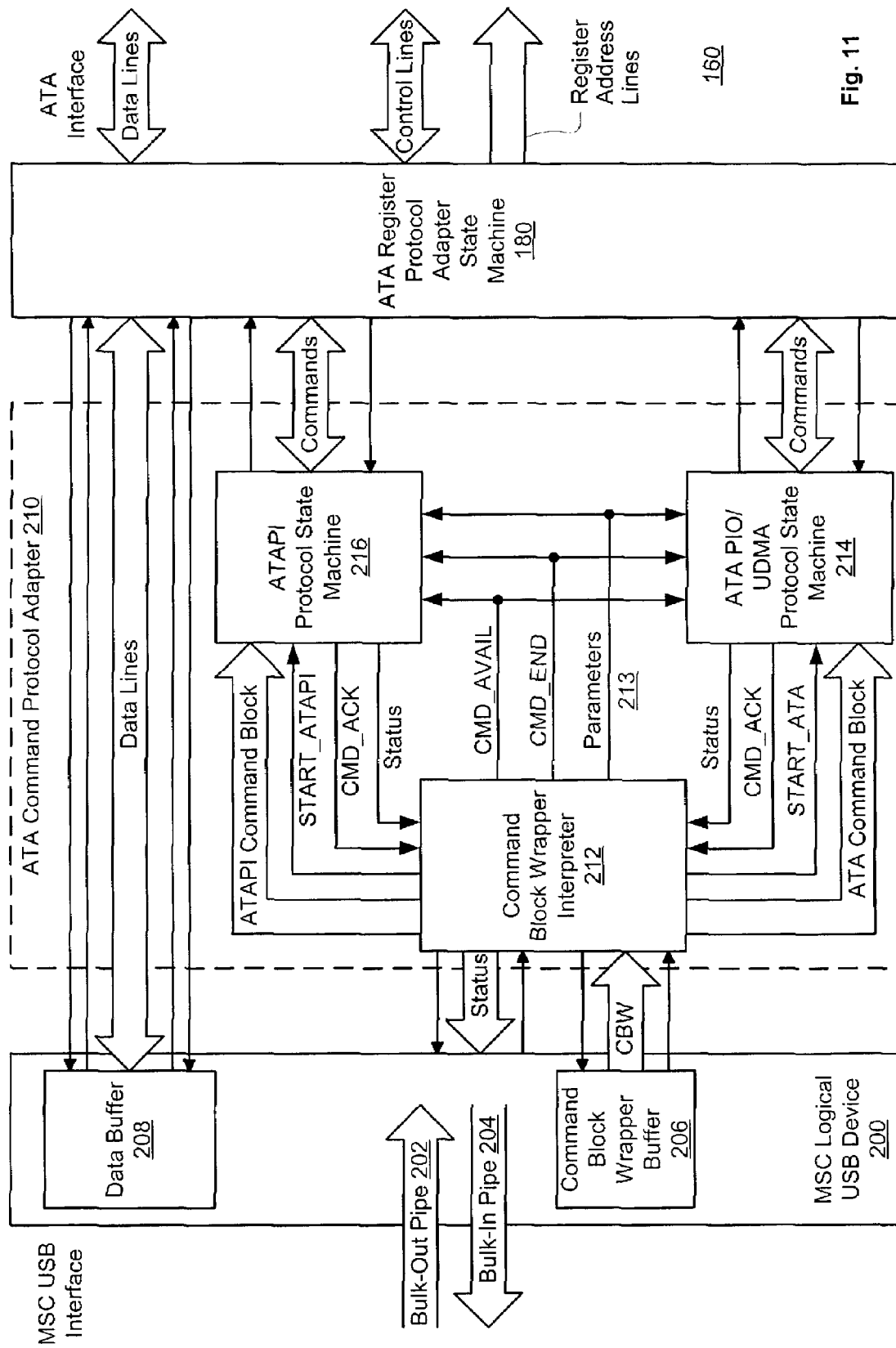
FIG. 11 depicts a block diagram for a hardware USB-ATA bridge according to an embodiment of the invention.

FIG. 11 shows a preferred embodiment for a USB-to-ATA bridging device 160 (the USB logical device and bus interface have been omitted in order that the internal signal paths can be displayed on one page). Three main blocks are shown: MSC logical USB device 200; ATA command protocol adapter 210; and ATA register protocol adapter state machine 180. Each block will be discussed in turn.

MSC logical USB device 200 peers with the host's MSC driver to provide delivery of command blocks, data, and status blocks via Bulk-Out Pipe 202 and Bulk-In Pipe 204. When a command block wrapper (CBW) arrives from the host on pipe 202, it is checked by logical device 200 for validity and meaningfulness. If the CBW passes these checks, the command block wrapper is placed in command block wrapper buffer 206.

Command block wrapper buffer 206 allows the host to issue multiple consecutive commands without having to wait for the preceding command to finish in each case. Buffer 206 connects to command block wrapper interpreter 212 via a command block wrapper transfer path and associated transfer handshaking signals. Buffer 206 supplies command block wrappers to command block wrapper interpreter 212 one at a time. When interpreter 212 returns status for the current command to logical device 200, command block wrapper buffer 206 will release the next command block wrapper if one is queued.

Data buffer 208 of logical device 200 provides bi-directional data buffering at the USB-to-ATA interface. Buffer 208 connects to ATA register protocol adapter state machine 180 via a bi-directional data transfer path and associated transfer handshaking signals. When a CBW indicates that data is to be written to the ATA device, the data is received on Bulk-Out Pipe 202 and stored in data buffer 208 for release to the ATA register protocol adapter. Similarly, when a CBW indicates that data (or register values) are to be read from the ATA register protocol adapter, data buffer 208 will receive the data from the ATA device and place the data on Bulk-In Pipe 204 for transfer to the host.

ATA command protocol adapter 210 comprises three main functional blocks. Command block wrapper interpreter 212 understands how to communicate with an MSC logical USB device via command and status blocks and how to submit command blocks to an appropriate protocol state machine. ATA PIO/UDMA (Programmed Input/Output/Ultra DMA) protocol state machine 214 receives ATA command blocks from interpreter 212 and initiates appropriate ATA transactions. Preferably, an ATAPI protocol state machine 216 also connects to interpreter 212, allowing the device to process ATAPI command packets as well.

Command block wrapper interpreter 212 can receive both ATA command blocks and ATAPI command blocks. It distinguishes an ATA command block by locating the signature 2424h in the wATACBSignature command block position. When the ATA signature is detected, interpreter 212 signals ATA protocol state machine 214 with the START_ATA command. State machine 214 returns a signal CMD_ACK indicating that it is ready for transfer of the ATA command block. Interpreter 212 asserts CMD_AVAIL when the first byte of the ATA command block is ready for transfer, and state machine 214 asserts CMD_ACK again when that byte has been clocked. This process continues until the entire command block has been clocked into state machine 214, at which point interpreter 212 asserts the CMD_END signal. Note also that during the command transfer, the data transfer length and direction are passed to state machine 214 over the parameters connection 213.

When a command block is received, interpreter 212 first checks that the proper wATACBSignature exists in the command block; if not, the command block is transferred to ATAPI protocol state machine 216 using timing similar to that used above.

The ATA command block arrives at ATA protocol state machine 214, e.g., in one of the formats depicted in FIGS. 9 and 10. ATA protocol state machine 214 parses the command block, and communicates with register protocol adapter state machine 180 to perform a sequence of ATA operations necessary to execute the register-delivered transaction requested in the ATACB. FIGS. 12a, 12b, and 12c illustrate one method of state machine operation.

FIG. 12a shows the initial sequence of register access operations 230 performed when a new command block arrives at ATA protocol state machine 214. The two command block bit-mapped fields bmATACBActionSelect and bmATACBRegisterSelect are latched into state machine 214, respectively, at blocks 244 and 246.

At block 248, execution branches depending on whether the command block is reading ATA register values or writing ATA register values. The flag TaskFileRead is checked. If TaskFileRead is zero, control is transferred to block 256 (and the register write path); otherwise, control is transferred to block 250 (and the register read path).

The read path consists of blocks 250, 252, and 254. Block 250 branches based on the flag PollAltStatOverride. When this flag is set to 0, execution branches to block 252; otherwise, block 252 is bypassed and execution continues at block 254.

At block 252, ATA protocol state machine 214 instructs ATA register protocol adapter state machine 180 to poll (repeatedly read) the ATA device's Alternate Status register until the BSY bit in that register is cleared by the device. When the BSY bit is cleared, the ERR and DRQ bits from the last Alternate Status register read are returned to ATA protocol state machine 214.

Note that the flowchart would be altered slightly here with the alternate ATACB format of FIG. 10a or FIG. 10b. Since these formats allow the DEV bit to be set in a register read situation, block 252 may be replaced with DEV bit setting logic (see blocks 260–266 for an example) in this case. The device selection operation already polls the Alternate Status register for BSY cleared, and thus this task need not be repeated.

At block 254, ATA command protocol adapter 210 performs all selected register reads. Using the register selection bits bmATACBRegisterSelect, state machine 214 executes up to eight reads of register values. As it steps through the register selection bits, if a bit=1 state machine 214 supplies the register address corresponding to that bit to state machine 180. State machine 180 performs the requested read and sends the register values to data buffer 208. If a register selection bit=0, state machine 214 instructs state machine 180 to send a byte value 00h to data buffer 208.

After state machine 214 has stepped through all register selection bits, it notifies command block wrapper interpreter 212 that the transaction has completed. Interpreter 212 builds an appropriate CSW for transport (back to the host) after the packet containing the register data. Note that in this implementation, a register read will return an eight-byte data packet. Accordingly, the dCBWDataTransferLength variable should be set to a value of eight when registers are to be read. In an alternate implementation where data was allowed to be returned in the CSW, the register values could instead be placed in the CSW and dCBWDataTransferLength could be set to 0 in the CBW.

The register write path begins at block 256. Two additional variables are latched into state machine 214: TransferLength is set initially to dCBWDataTransferLength at block 256, and BlockSize is set to ATACBTransferBlockCount at block 258.

ATA device selection is performed next, if necessary. Block 260 refers to the DeviceSelectionOverride bit; if the bit is clear, control branches to block 262. Block 262 refers to the DEVOverride bit. If this bit is clear, at block 264 state machine 214 instructs state machine 180 to write, to the ATA device's Device/Head register, a DEV value internally determined by the bridge. Otherwise, at block 266 state machine 214 instructs state machine 180 to write to that register the DEV value specified in the Device/Head register field of the ATACB. Note that if the DeviceSelectionOverride bit is set, the pre-existing DEV value on the device's Device/Head register is maintained.

After ATA device selection, block 268 writes the registers enabled in bmATACBRegisterSelect using the values received in bATACBTaskFileWriteData. This function proceeds much like block 254 each register selection bit is examined in sequence, and if that bit is set, the corresponding task file write data byte is supplied to state machine 180 for writing to the ATA device, along with the proper register address. If a register bit is cleared, the corresponding register is left in its pre-existing state. Note that when the DEVOverride bit is clear, any write to the Device/Head register will use the internally-identified DEV value. The last register written (if the last register selection bit is set) is the Command register; after writing this register, state machine 214 enters data phase 330 of the flowchart.

Referring next to FIG. 12b, data phase operations 330 are shown. The data phase is entered at block 344. Block 344 branches based on the flag PollAltStatOverride. When this flag is set to 0, execution branches to block 348; otherwise, execution continues at block 346.

At block 348, ATA protocol state machine 214 instructs ATA register protocol adapter state machine 180 to poll (repeatedly read) the ATA device's Alternate Status register until the BSY bit in that register is cleared by the device. When the BSY bit is cleared, the ERR and DRQ bits from the last Alternate Status register read are returned to ATA protocol state machine 214. The state machine then branches to the error check logic found in FIG. 12c (a discussion of FIG. 12c follows the discussion of FIG. 12b).

When the bridge is not polling the Alternate Status register, block 346 checks the variable TransferLength to see if any data remains to be transferred. If no data remains, the transaction is done, and interpreter 212 is signaled. If data remains, execution branches to block 332. Note that block 332 can also be reached from FIG. 12c if execution of that flowchart reaches the "Data Xfer" point.

Block 332 determines whether the amount of data left to transfer (TransferLength) is less than the current blocksize. If this comparison is true, block 338 sets ByteCount equal to TransferLength. Block 340 then sets TransferLength to zero. If the comparison of block 332 is false, block 334 sets ByteCount=Blocksize*512. Block 336 then decrements TransferLength by Blocksize*512.

Both block 336 and block 340 branch to block 342. At block 342, ByteCount bytes of data are transferred by an ATA transfer. The Direction bit (from the CBW field bmCBWFlags) determines whether ByteCount bytes will be read from data buffer 208 and written to the ATA device, or whether ByteCount bytes will be read from the ATA device and written to data buffer 208. Note that state machine 180 also conforms to the current ATA transfer mode as specified by the UDMAEnable bit. When the UDMAEnable bit is set, data transfers use ATA DMA signaling. Otherwise, data transfers use ATA PIO signaling. Optionally, adapter 210 can compare the UDMAEnable bit to the current data transfer mode, and set a different ATA mode on the device if a conflict exists.

After ByteCount bytes are transferred, control is returned to block 344, where more bytes of data can be transferred if more remain.

FIG. 12c illustrates the error check logic 280. This logic varies slightly depending on whether data remains to be transferred. Block 282 performs a check of TransferLength. If TransferLength is greater than zero, control branches to block 300; otherwise, control branches to block 284.

Block 300 checks bit 0 of DPErrorOverride. If this bit is set, phase error conditions are ignored, and control is transferred to block 310. If this bit is cleared, but DRQ is set, the device is ready to transfer data (no phase error exists), and control is transferred to block 310. Block 310 reads the ATA Status register to clear INTRQ. Control is then transferred to the data transfer phase of FIG. 12b.

When control reaches block 304, a phase error exists. Block 304 checks bit 1 of DPErrorOverride. If this bit is set, device error conditions are not checked, and a phase error will be reported to interpreter 212. If this bit is cleared, but block 306 determines that no device error (as reported in ERR) exists, a phase error will also be reported. Finally, if the bit is cleared but ERR is set, control branches to block 308. At block 308, the ATA Status register is read to clear INTRQ, and then a failure is reported.

The logic proceeds in a slightly different manner when no data remains to transfer. If bit 0 of DPErrorOverride is clear and DRQ is set (the ATA device still expects a data transfer), a phase error is reported. Otherwise, block 288 checks bit 1 of DPErrorOverride; if this bit is set, ERR is ignored and control is transferred to block 292. Otherwise, block 290 checks whether ERR is set, and, if set, control is transferred to block 308 for failure reporting.

Block 292 reads the ATA Status register to clear INTRQ, and then normal completion is reported to interpreter 212.

Returning for a moment to FIG. 11, the function of block 216 will be mentioned briefly. When a command block does not have an ATA signature, it is assumed to be an ATAPI command block. The ATAPI command block is essentially just the ATAPI transport protocol packet. Protocol state machine 216 is hard-wired to initiate a PACKET command upon receiving a START_ATAPI command from interpreter 212. The ATAPI command block is clocked through onto the data lines of the ATA interface when the ATAPI device is ready to receive the ATAPI packet. Note that the embodiment of FIG. 11 allows a host to read the registers of an ATAPI device and to initiate ATA commands (other than the PACKET command) on such a device by issuing an ATACB to the device.

From the preceding discussion, it can be appreciated that the described embodiments allow a host a high degree of ATA functionality from a location remote to the ATA bus. A given ATA transaction or set of register accesses can be initiated via one packet. The bridging device then performs an appropriate sequence of ATA operations necessary to execute the given ATA register-delivered transaction. During this time period, the host is free to perform other functions without waiting for the ATA device to respond. The bridging device handles the asynchronous ATA timing issues without intervention from the host.

Different levels of control can be enabled by changing the division of labor between the ATA host driver and the ATA command protocol adapter. For instance, a PACKET (A0h) transaction may be performed using multiple command blocks. Consecutive command blocks initiate register accesses to handle all portions of the necessary protocol. This is but one example of how the present description could be modified to adjust the host/bridge duty division.

The Multiple type ATA commands may be used to increase ATA bus efficiency. For instance, the protocol can allow bATACBTransferBlockCount to differ from "Sectors per block" as set in the last SET_MULTIPLE_MODE command. If such a difference exists, the bridge can be configured to automatically issue a new SET_MULTIPLE_MODE command, or to set the mode if currently unset. This is but one example of how the present description could be modified to adjust the ATA bus efficiency.

Figure 13A:
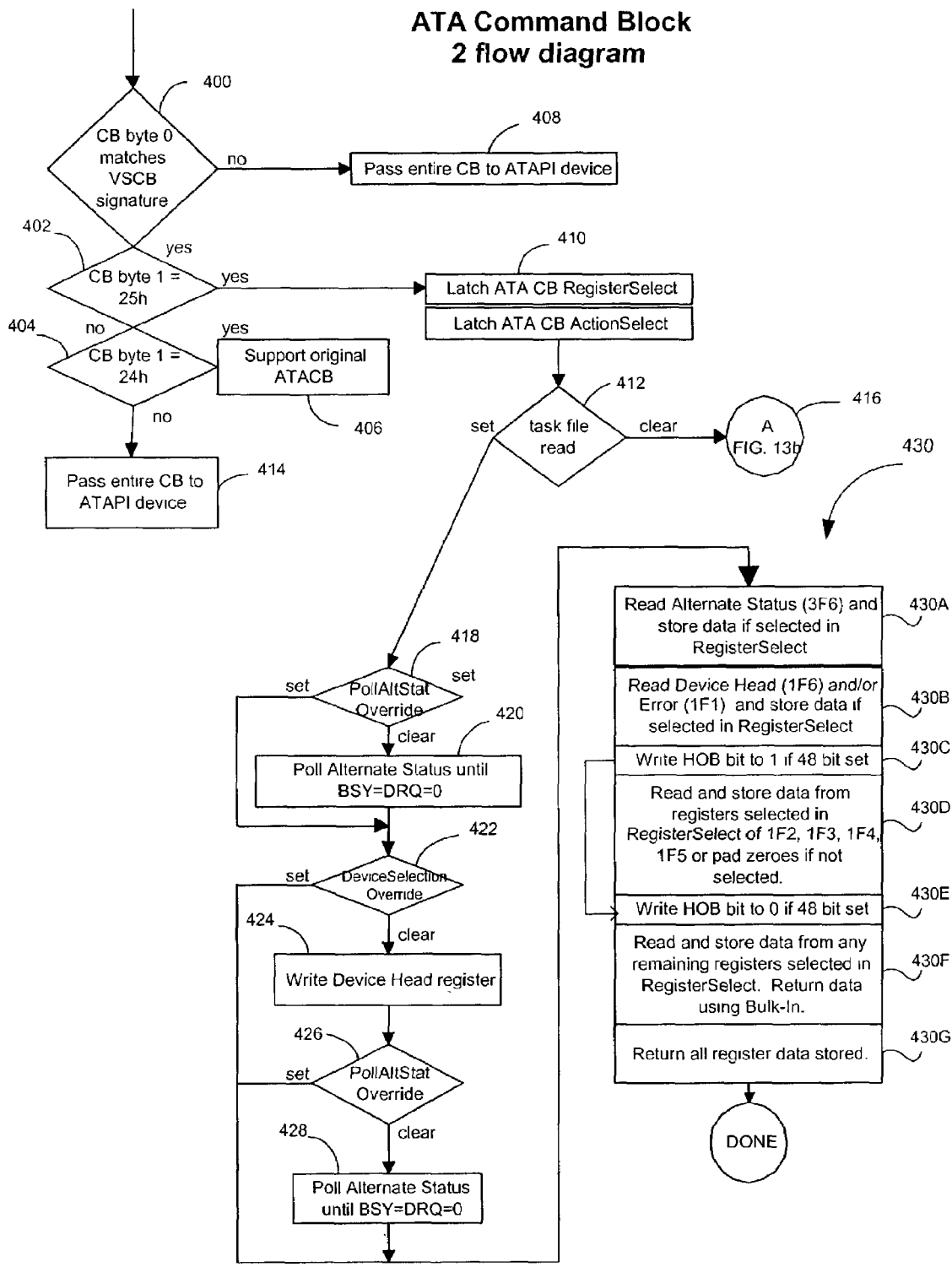
FIGS. 13*a*–13*c* show a flowchart for an alternative method of operating a USB-ATA bridge.
Figure 13B:
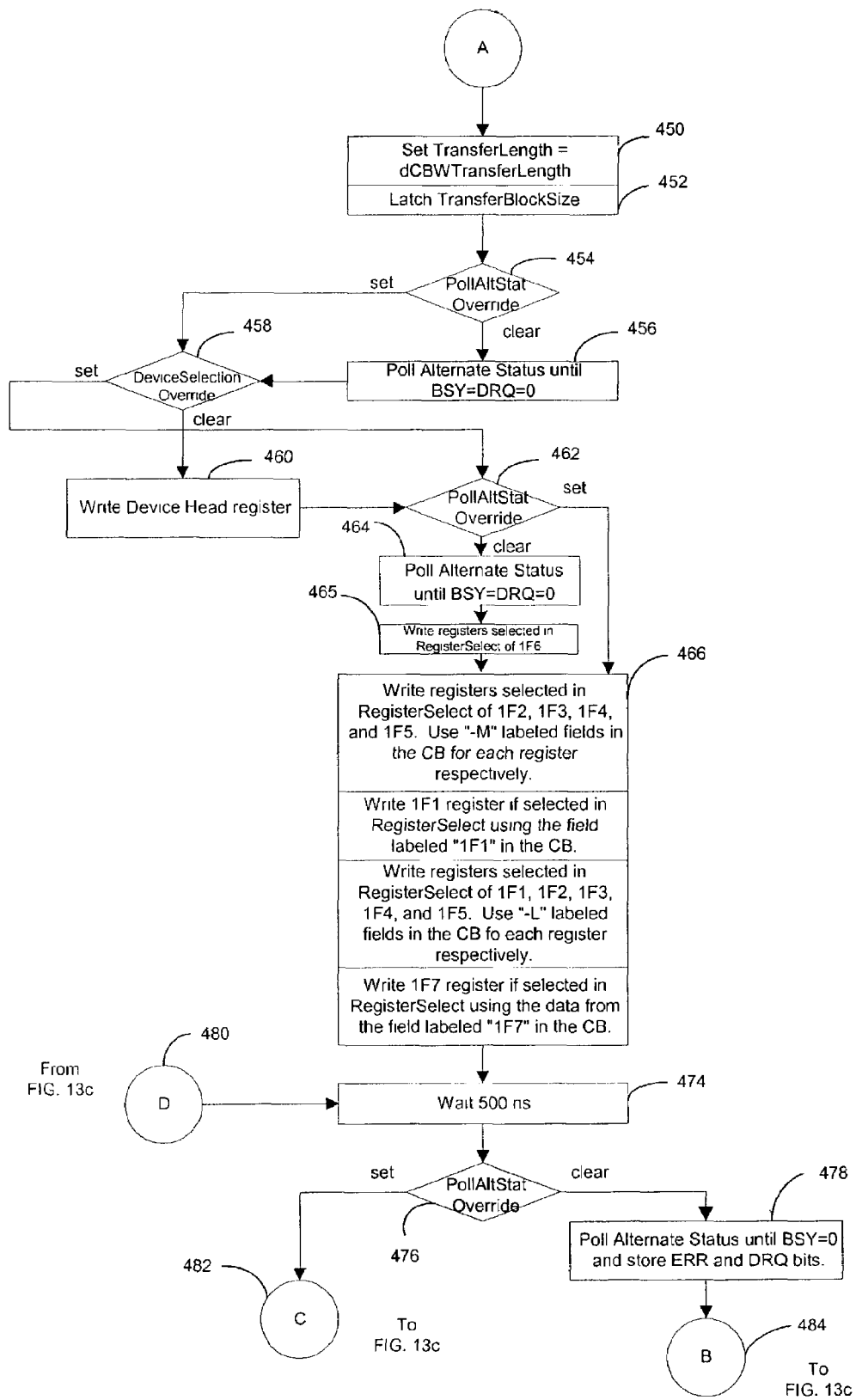
Figure 13C:
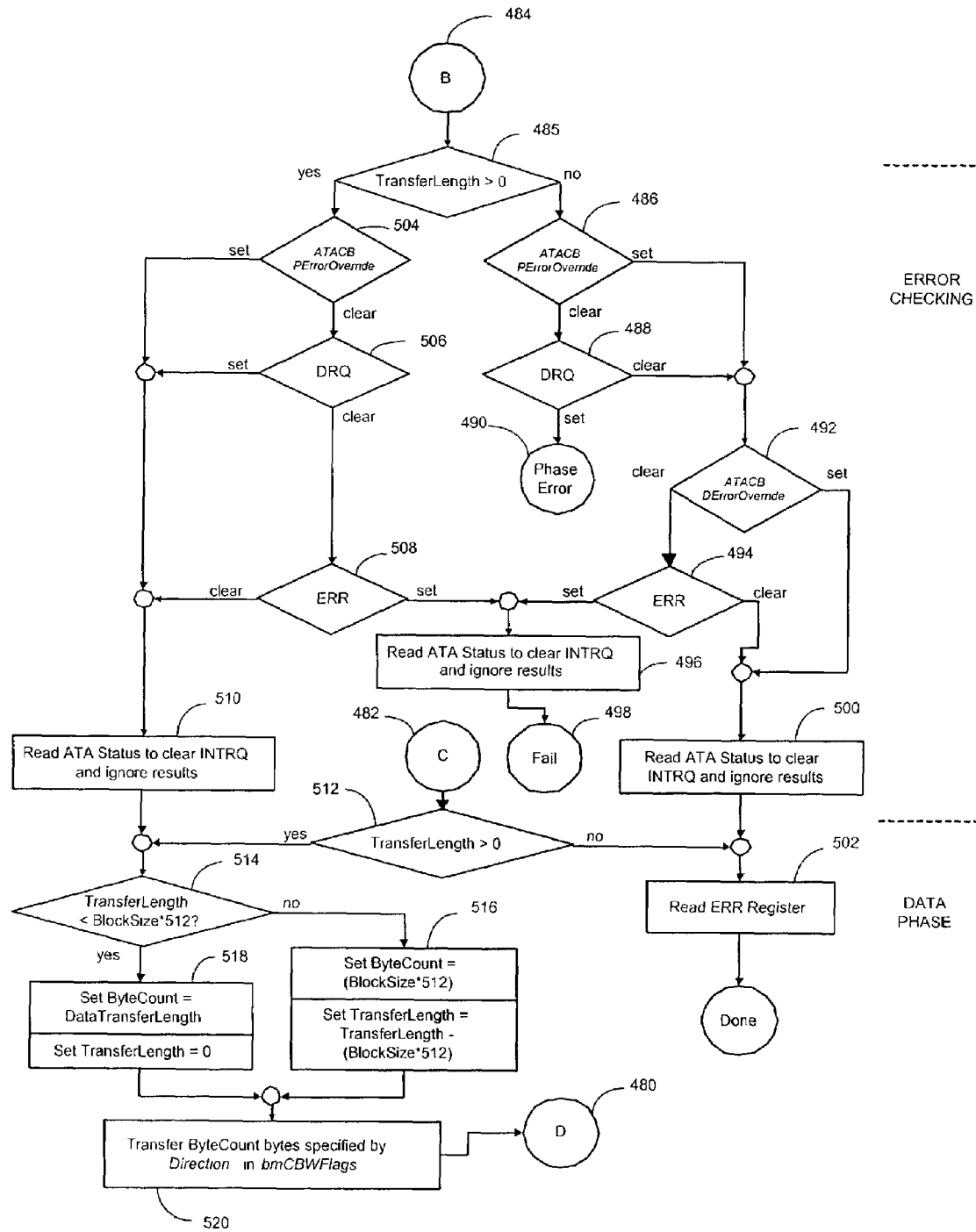

FIGS. 13a–13c show how extended register access operations are performed using the ATACB2 shown in FIG. 10b. In the ATACB2 configuration shown in FIG. 10b, and as described in flow diagram 13a–13c, the bridge can specify the Device Head bit for device selection. The bridge can then map to the appropriate device register. Alternatively, the host can override bridge configuration and control both device selection and register writing.

The extended ATACB2 format allows device selection to occur before either a TaskFileWrite or TaskFileRead, depending upon DeviceSelectionOverride. The additional device selection before reading the TaskFile replaces polling for Alternate Status for BSY=0 since the device selection already polls Alternate Status for BSY=0. All ActionSelect bits operate similar to the command block in FIG. 10a but apply to more points in the operational flow.

Referring to FIG. 13a, the command block wrapper interpreter 212 reads byte 0 of the ATACB2. If byte 0 does not match Vendor Specific Command Block (VSCB), the entire CB is passed to the ATAPI device in block 408. If the command block byte 1 equals 25 Hex, then processing is performed assuming the ATACB2 shown in FIG. 10b. If the command block byte 1 equals 24 Hex, then the processing is performed assuming the command block shown in FIG. 9 or 10a. If the command block byte 1 does not equal 25 Hex or 24 Hex, then the entire command block is passed to the ATAPI device. Of course, other values could be used for identifying the command blocks.

In block 410 a reversed order is used for first latching the ATACB2 RegisterSelect in FIG. 10b and then latching the ATACB2 ActionSelect in FIG. 10b into state machine 214. At block 412, execution branches depending on whether the command block is reading ATA register values or writing ATA register values. The TaskfileRead flag is checked. If TaskFileRead is cleared, control is transferred to a register write path in block 416. Otherwise, control is transferred to a register read path in block 418.

The block 418 branches based on a PollAltStatOverride flag. When this flag is cleared, execution branches to block 420; otherwise, block 420 is bypassed and execution continues at block 422. At block 420, ATA protocol state machine 214 instructs ATA register protocol adapter state machine 180 to poll (repeatedly read) the ATA device's Alternate Status register until the BSY bit and DRQ bit in that register are cleared by the ATA device.

When the BSY bit and DRQ bit are cleared, a DeviceSelectionOverride flag is checked in block 422. If the DeviceSelectionOverride flag is zero, in block 424 the DevOverride flag causes bit 4 from byte 5 in FIG. 10b to be written to bit 4 of the Device/Head register instead of a value determined by the bridge. The remaining bits in the Device/Head register are provided from the bridge, regardless of the value of the DEVOverride flag. If the PollAltStatOverride flag is cleared in block 426, the Alternate Status register is polled until the BSY bit and DRQ bit are cleared by the ATA device in block 428.

ATA command protocol adapter 210 performs register reads in block 430. The RegisterSelect bits are used by state machine 214 to read register values. As the state machine steps through the register selection bits, if a bit=1 state machine 214 supplies the register address corresponding to that bit to state machine 180. State machine 180 performs the requested read and sends the register values to data buffer 208. If a register selection bit=0, state machine 214 instructs state machine 180 to send a byte value 00h to data buffer 208.

The Alternate Status register is read and stored if the associated RegisterSelect bit is selected in block 430A. The 1F6(Device/Head) register and the 1F1(Error) register are read in block 430B, if the associated RegisterSelect bit is selected. A branch occurs from block 430C down to block 430E, when the "48-bit" is set. The HOB bit is set to one if 48-bit is set.

The registers 1F2, 1F3, 1F4, and 1F5 are only read in block 430D if both the register is selected in RegisterSelect and "48-bit" is set, otherwise zeroes are returned. The HOB bit is cleared to zero in block 430F, if 48-bit is set. Also The 6th block is where the registers 1F2, 1F3, 1F4, 1F5, 1F7 are read if selected in RegisterSelect. All stored register data is returned in block 430G.

After state machine 214 has stepped through all register selection bits, it notifies command block wrapper interpreter 212 that the transaction has completed. Interpreter 212 builds an appropriate CSW for transport (back to the host) after the packet containing the register data. In an alternate implementation where data was allowed to be returned in the CSW, the register values could instead be placed in the CSW and dCBWDataTransferLength could be set to 0 in the CBW.

The register write path begins at block 416 in FIG. 13b. Two additional variables are latched into state machine 214: TransferLength is set initially to dCBWTransferLength at block 450, and BlockSize is set to ATACBTransferBlockCount at block 452. If the PollAltStatOverride bit is set in block 454, then the DeviceSelectionOverride bit is checked in block 458. If the PollAltStatOverride bit is cleared, then the Alternate Status register is polled until BSY and DRQ are cleared in block 456.

If the DeviceSelectionOverride flag is zero in block 458, DevOverride flag causes bit 4 from byte 5 in FIG. 10b to be written to bit 4 of the Device/Head register in block 440, instead of a value as determined by the bridge. The remaining bits in the Device/Head register are provided from the bridge, regardless of the value of the DEVOverride flag.

For example, a Device/Head register write can be performed during Device Selection with DEV from the bridge or host (ATACB byte 5 bit 4) and remaining bits written by the bridge. Alternatively, the Device/Head register write can be performed with DEV from bridge or host (ATACB byte 5 bit 4) and remaining bits written by the host (ATACB byte 5).

Thus, the host may force it's value of DEV or allow the bridge to decide. A host may force it's value for the bits other than DEV or allow the bridge to decide. A host may cause the Device/Head register not to be written for any CBW in either case of Device Selection or Register writing.

For example, some of the device/head register bits may be used in an ATAPI device for Logical Unit Number (LUN) selection. The bridge circuit may need to set the DEV bit but not override the other bits in the device/head register used for LUN selection. This protocol allows the DEV bit to be written independently from the other bits in the device/head register.

After the Device Head register is written, the PollAltStatOverride bit is checked again in block 462. If the PollAltStatOverride bit is set or the BSY and DRQ are cleared in block 464, block 465 writes the registers selected in RegisterSelect of 1F6. Block 466 writes the registers 1F2–1F5 enabled in the RegisterSelect field. If no registers are enabled, then no registers will be written. The –M labeled fields in the command block are written for each register respectively. Then the -L labeled fields in the command block are written. The Features and Command registers are written if enabled in the RegisterSelect field.

A 500 nanosecond delay is performed in block 474. Block 476 branches based on the PollAltStatOverride flag. When this flag is clear, execution branches to block 478; otherwise, execution continues at block 482.

At block 478, ATA protocol state machine 214 instructs ATA register protocol adapter state machine 180 to poll (repeatedly read) the ATA device's Alternate Status register until the BSY bit in that register is cleared by the device. When the BSY bit is cleared, the ERR and DRQ bits from the last Alternate Status register read are returned to ATA protocol state machine 214. The state machine then branches to the error checking logic found in FIG. 13c.

When the PollAltStatOverride flag is set in block 476, block 482 goes to a data phase in block 512 of FIG. 13C. Block 512 checks the variable TransferLength to see if any data remains to be transferred. If no data remains, an ERR register is read in block 502, the transaction is done, and interpreter 212 is signaled. If data remains, execution branches to block 514. Block 514 determines whether the amount of data left to transfer (TransferLength) is less than the current blocksize. If this comparison is true, block 518 sets ByteCount equal to TransferLength and sets TransferLength to zero. If the comparison of block 514 is false, block 516 sets ByteCount=Blocksize*512 then decrements TransferLength by Blocksize*512.

Both block 518 and block 516 branch to block 520. At block 520, ByteCount bytes of data are transferred by an ATA transfer. The Direction bit from the CBW field bmCBWFlags (byte 12 in FIG. 9) determines whether ByteCount bytes will be read from data buffer 208 and written to the ATA device, or whether the bytes will be read from the ATA device and written to data buffer 208. After the bytes are transferred, control is returned to block 480, where more bytes of data can be transferred if more remain.

Block 484 initiates error check logic in FIG. 13b. This logic varies slightly depending on whether data remains to be transferred. Block 485 performs a check of TransferLength. If TransferLength is greater than zero, control branches to block 504; otherwise, control branches to block 486.

Block 504 checks the PErrorOverride flag. If this flag is set, phase error conditions are ignored, and control is transferred to block 510. If this flag is cleared in block 504, but DRQ is set, the device is ready to transfer data (no phase error exists), and control is transferred to block 510. Block 510 reads the ATA Status Register to clear INTRQ. Control is then transferred to the data transfer phase in block 514.

In block 508, if the ERR bit is set, control branches to block 496 where the ATA Status Register is read to clear INTRQ and then a failure is reported in block 498. If ERR is cleared, control branches to block 510.

The logic proceeds in a slightly different manner when no data remains to transfer in block 485. If PErrorOverride is clear in block 486, a phase error is reported in block 490 when DRQ is set. Otherwise, block 492 checks the DErrorOverride; if this bit is set, ERR is ignored and control is transferred to block 500. Block 500 reads the ATA Status register to clear INTRQ, and then normal completion is reported to interpreter 212. Otherwise, block 494 checks whether ERR is set, and if set, control is transferred to block 496 for failure reporting.

Although the above embodiments have referred to USB 1.0 and its Mass Storage Class, these are merely exemplary.

A working embodiment need not use the MSC. The present invention is also applicable to USB 2.0, as well as to other packet data transport protocols.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A packet-to-ATA bridge device, comprising:
an interface receiving a packet comprising an Advanced Technology Attachment (ATA) command block for executing ATA register transactions, wherein the command block includes a signature field identifying the command block as an ATA command block and a subcommand field indicating an extended or nonextended register addressing scheme associated with the ATA register; and
an ATA adapter identifying the register addressing scheme according to a predefined value in the subcommand field, addressing an ATA device with the extended or a nonextended register addressing scheme corresponding with the command block extended or nonextended register addressing scheme identifier in the subcommand field, executing either extended or nonextended ATA commands in the command block, and conducting the ATA register transactions in the ATA device addressed according to the identified register addressing scheme.

2. The device according to claim 1 wherein a single command block designates the extended or nonextended register addressing scheme and contains extended or nonextended ATA commands for performing the associated extended or nonextended ATA register transactions.

3. The device according to claim 1 wherein the ATA command block includes a register select field located before an action select field.

4. The device according to claim 1 wherein the ATA command block includes separate most significant and least significant fields for accessing different registers in an ATA device.

5. The device according to claim 4 wherein the ATA command block includes a most significant and least significant sector count field, sector number field, cylinder low field, and cylinder high field.

6. The device according to claim 1 wherein the ATA command block includes multiple bits representing an exponential for a transfer block size value.

7. The device according to claim 1 wherein the ATA adapter writes a device head register using either a value in the ATA command block or an internal value in the bridge device according to a device override flag.

8. The device according to claim 1 wherein the ATA adapter enables a device selection bit in a device selection register to be written to independently from other bits in the device selection register.

9. The device according to claim 1 wherein the interface includes command block wrapper buffer that receives the ATA command block as a USB packet from a host over a Universal Serial Bus and the ATA adapter includes a command block wrapper interpreter determining whether the ATA command block corresponds to ATA register transactions in an ATA device having extended or nonextended register addressing scheme, an ATA protocol state machine parsing the command block into a sequence of ATA register-delivered transactions corresponding to extended or nonextended ATA commands contained in the ATA command block, and an ATA register protocol adapter state machine performing the sequence of ATA register-delivered transactions corresponding to the extended or nonextended ATA commands.

10. A method of operating a packet-to-ATA bridge circuit, comprising:
 receiving a packet comprising an ATA command block, wherein the command block includes a signature field identifying the command block as an ATA command block and a subcommand field indicating a register addressing scheme;
 executing either extended or nonextended ATA commands in the command block, wherein executing the ATA commands comprises:
  identifying the register addressing scheme in the ATA command block according to predefined values in the signature field and the subcommand field;
  addressing an ATA device having the extended or nonextended register addressing scheme;
  parsing the command block into a sequence of register operations according to the extended or nonextended register addressing scheme; and
  sending the sequence of register operations to the ATA device addressed.

11. The method according to claim 10 wherein the same command block designates the register addressing scheme and contains the extended or nonextended ATA commands.

12. The method according to claim 10 including identifying a nonextended addressing scheme associated with the command block and parsing the command block into a sequence of register operations according to the nonextended register addressing scheme.

13. The method according to claim 10 including writing a DEV value into a device head register independently of other values in the device head register.

14. The method according to claim 10 including writing a device head register using a value from the command block or using a value from the bridge circuit.

15. The method according to claim 10 including:
 identifying an extended register addressing scheme associated with the command block; and
 parsing the command block into a sequence of ATA register operations according to the extended register addressing scheme.

16. The method according to claim 10 including accessing a most significant address value for a register in an Advanced Technology Attachment (ATA) device and accessing a least significant address value for the register in the ATA device.

17. A host, comprising:
 a processor generating a command block containing register access information for executing Advanced Technology Attachment (ATA) register-delivered transactions, the command block including fields for a signature field identifying the command block as an ATA command block, a subcommand field indicating a register addressing scheme associated with the ATA register-delivered transactions, a most significant ATA register address field and a least significant ATA register address field, and either extended or nonextended ATA commands, wherein the same command block designates the extended or nonextended register addressing scheme and contains the extended or nonextended ATA commands for performing the associated extended or nonextended ATA register transactions.

18. The host according to claim 17 wherein the register addressing scheme comprises a first ATA addressing scheme and a second ATA addressing scheme according to predefined values in the signature field and the subcommand field.

19. The host according to claim 18 wherein the first ATA addressing scheme is for 28 bit ATA transactions and the second ATA addressing scheme is for 48 bit ATA transactions.

20. The host according to claim 17 including an interface for transferring the command block over a Universal Serial Bus (USB) to a U.S.B-to-ATA bridge.

* * * * *